United States Patent
Yamano et al.

(10) Patent No.: US 8,379,608 B2
(45) Date of Patent: Feb. 19, 2013

(54) RADIO COMMUNICATION METHOD, RADIO COMMUNICATION SYSTEM AND WIRELESS TERMINAL

(75) Inventors: Satoru Yamano, Tokyo (JP); Masanobu Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 1106 days.

(21) Appl. No.: 11/043,172

(22) Filed: Jan. 27, 2005

(65) Prior Publication Data

US 2005/0163088 A1 Jul. 28, 2005

(30) Foreign Application Priority Data

Jan. 27, 2004 (JP) ................................ 2004-019053

(51) Int. Cl.
*H04W 4/00* (2009.01)
*H04J 3/00* (2006.01)
*H04J 99/00* (2009.01)

(52) U.S. Cl. .................... 370/338; 370/476; 370/913

(58) Field of Classification Search .................. 370/338, 370/913, 476, 311
See application file for complete search history.

(56) References Cited

U.S. PATENT DOCUMENTS

| | | | | |
|---|---|---|---|---|
| 4,523,332 A | * | 6/1985 | Mori | 340/7.33 |
| 4,745,408 A | * | 5/1988 | Nagata et al. | 340/7.36 |
| 7,039,068 B1 | * | 5/2006 | Halasz | 370/473 |
| 7,339,957 B2 | * | 3/2008 | Hitt | 370/509 |
| 2003/0137966 A1 | * | 7/2003 | Odman et al. | 370/347 |
| 2004/0064583 A1 | * | 4/2004 | Dani et al. | 709/241 |
| 2004/0266491 A1 | * | 12/2004 | Howard et al. | 455/567 |
| 2007/0230437 A1 | * | 10/2007 | Schopf | 370/352 |

FOREIGN PATENT DOCUMENTS

| | | |
|---|---|---|
| JP | H061-33027 A | 2/1986 |
| JP | 6-140984 A | 5/1994 |
| JP | 2000-270041 A | 9/2000 |
| JP | 2001-189689 A | 7/2001 |
| JP | 2003-109493 A | 4/2003 |
| JP | 2003-367577 A | 10/2003 |

OTHER PUBLICATIONS

Daisuke Kawasaki et al., "Development of an Ultra-Low Power Consumption Wireless Sensor Network" Collection of Conference Lecture papers of the 2003 Institute of Electronics, Sep. 10, 2003, p. 579, Information and Communication Engineers.

* cited by examiner

*Primary Examiner* — John Blanton
(74) *Attorney, Agent, or Firm* — Sughrue Mion, PLLC

(57) ABSTRACT

A radio communication method, a radio communication system and a wireless terminal by which low power consumption and the flexibility of a network can be realized. A base station and wireless terminals change an intermittent receive period and the preamble length of data on the basis of characteristics of the multihop radio network to carry out the intermittent receiving of data. Thus, a wireless terminal relaying data can receive the data reliably and a useless boot-up of a receiving part and standby time can be largely reduced to achieve low power consumption.

65 Claims, 11 Drawing Sheets

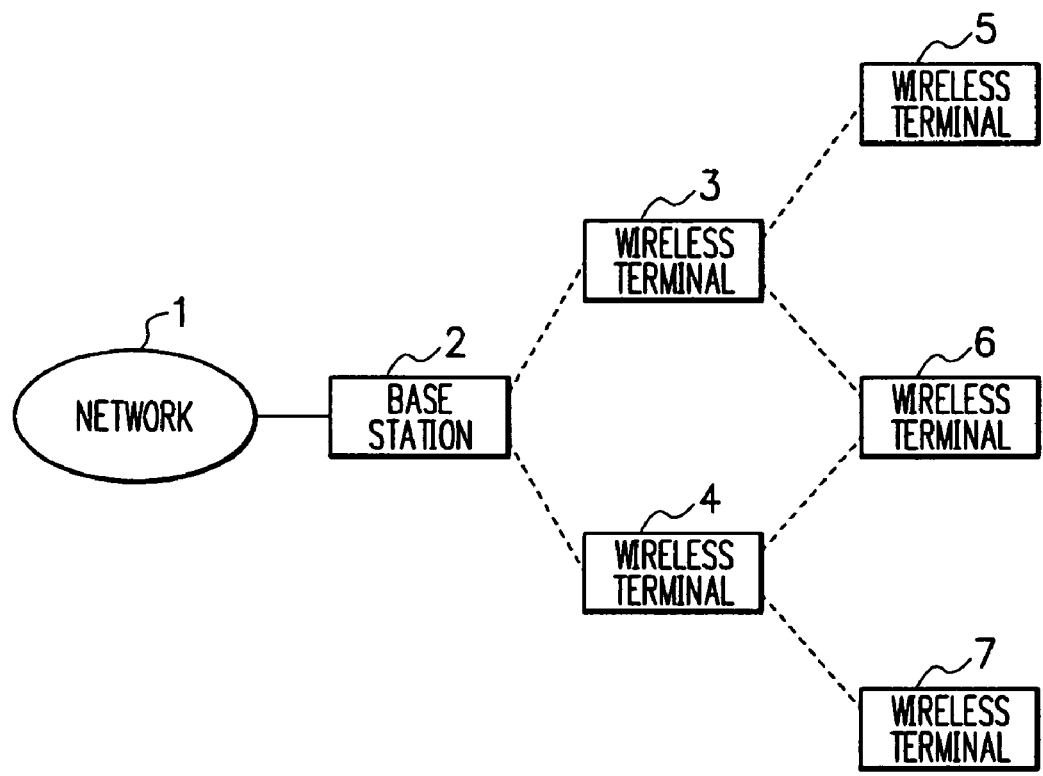
F I G. 1

RADIO COMMUNICATION METHOD, RADIO COMMUNICATION SYSTEM AND WIRELESS TERMINAL

BACKGROUND OF THE INVENTION

The present invention relates to a radio communication method and a radio communication system including a plurality of wireless terminals in a multihop radio network where data are transferred in such a manner as to pass a bucket or packet from a sending wireless terminal to a receiving wireless terminal via another wireless terminal, and a wireless terminal for use in the radio communication method and the radio communication system.

In a conventional multihop radio network such as a radio sensor network or the like, power consumption in data communication is larger than that in the waiting or stand-by state. However, in terms of a time period, the waiting state occupies most time and the whole power consumption is largely affected by the power consumption in the waiting state. Accordingly, it is essential for each wireless terminal to reduce power consumption in the waiting state as low as possible. In order to realize the reduction of the power consumption, for example, intermittent receive operation has been proposed, as disclosed in Japanese Patent Application laid open No. Sho61-33027 and Japanese Patent Application No. 2003-367577, and low power consumption operation using a clock, as disclosed in Japanese Patent Application No. 2003-109493.

However, when the simple intermittent receive operation is used, although the power consumption can be reduced to some extent, the power is often wasted when traffic is light. On the other hand, when the low power consumption operation using the clock is employed, although the reduction of the power consumption is expected, none of the communications can be done except in communicable time.

SUMMARY OF THE INVENTION

It is therefore an object of the present invention to provide a radio communication method, a radio communication system and a wireless terminal for resolving the aforementioned problems of the prior art and realizing a low power consumption and flexibility of networks.

In accordance with one aspect of the present invention, there is provided a radio communication method of a multihop radio network including a plurality of wireless terminals, in which a receiving side wireless terminal changes an intermittent receive period and a sending side wireless terminal changes the preamble length of data on the basis of characteristics of the multihop radio network to carry out the intermittent receiving of the data.

In another aspect of the radio communication method, the characteristics depend on a change in traffic, network topology, time, battery remaining power of the wireless terminals or occurrence of an event.

In another aspect of the radio communication method, one wireless terminal as a base station monitors the traffic. When the volume of traffic is larger than a predetermined upper limit value, the intermittent receive period and the preamble length of data of the wireless terminals constituting the multihop radio network are shortened and, when the volume of traffic is smaller than a predetermined lower limit value, the intermittent receive period and the preamble length of data of the wireless terminals constituting the multihop radio network are extended.

In another aspect of the radio communication method, when the volume of traffic received by the receiving side wireless terminal is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, when the volume of traffic sent from the sending side wireless terminal is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, one wireless terminal as a base station detects a topology change. When the volume of traffic expected by the topology change is larger than a predetermined upper limit value, the intermittent receive period and the preamble length of data of the wireless terminals constituting the multihop radio network are shortened and, when the volume of traffic is smaller than a predetermined lower limit value, the intermittent receive period and the preamble length of data of the wireless terminals constituting the multihop radio network are extended.

In another aspect of the radio communication method, when the expected volume of traffic received by the receiving side wireless terminal which varies according to a topology change of the multihop radio network is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, when the expected volume of traffic sent from the sending side wireless terminal which varies according to a topology change of the multihop radio network is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, one wireless terminal as a base station detects the time and, at a predetermined time, the intermittent receive period and the preamble length of data of the wireless terminals constituting the multihop radio network are changed.

In another aspect of the radio communication method, the wireless terminals constituting the multihop radio network detect the time and, at a predetermined time, and change the intermittent receive period and the preamble length of data.

In another aspect of the radio communication method, when the expected volume of traffic received by the receiving side wireless terminal which varies according to the time is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, when the expected volume of traffic sent from the sending side wireless terminal which varies according to the time is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, the sending side wireless terminal detects the occurrence of an event. When the volume of traffic sent from the sending side wireless terminal which is expected by the occurrence of an event detected is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication method, the wireless terminals inform one wireless terminal as a base station of their battery remaining power and the base station changes the intermittent receive period and the preamble length of data of the wireless terminals constituting the multihop radio network according to the battery remaining power informed.

In another aspect of the radio communication method, the receiving side wireless terminal detects the battery remaining power. When the battery remaining power is larger than a predetermined upper limit value, the intermittent receive period of the receiving side wireless terminal and the preamble length of data of the sending side wireless terminal are shortened and, when the battery remaining power is smaller than a predetermined lower limit value, the intermittent receive period of the receiving side wireless terminal and the preamble length of data of the sending side wireless terminal are extended.

In another aspect of the radio communication method, one wireless terminal monitors at least one of the time, a topology change of the multihop radio network and the received traffic, transmitted traffic, occurrence of an event and battery remaining power of one or more wireless terminals constituting the multihop radio network and determines the intermittent receive period and the preamble length of data of each wireless terminal on the basis of the monitoring.

In accordance with another aspect of the present invention, there is provided a radio communication system of a multihop radio network including a plurality of wireless terminals, comprising: a receiving side wireless terminal including network characteristics detecting means for detecting characteristics of the multihop radio network and intermittent receive period setting means; and a sending side wireless terminal including preamble length changing means, wherein when the network characteristics detecting means detects a change of the characteristics of the network, the intermittent receive period setting means changes an intermittent receive period, and the preamble length changing means changes the preamble length of data.

In another aspect of the radio communication system, the characteristics depend on a change in traffic, network topology, time, battery remaining power of the wireless terminals or occurrence of an event.

In another aspect of the radio communication system, one wireless terminal as a base station further includes: monitoring means for monitoring the traffic of the multihop radio network; determining means for determining the intermittent receive period and the preamble length of data of the wireless terminals constituting the multihop radio network on the basis of the traffic monitored by the monitoring means; and informing means for informing the wireless terminals constituting the multihop radio network of the intermittent receive period and the preamble length of data determined by the determining means, each of the wireless terminals constituting the multihop radio network includes receiving means for receiving the information on the intermittent receive period and the preamble length of data from the base station, and the wireless terminals constituting the multihop radio network change the intermittent receive period and the preamble length of data on the basis of the information received by the receiving means.

In another aspect of the radio communication system, the receiving side wireless terminal further includes measuring means for measuring the volume of traffic of received data. When the volume of traffic measured is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, the sending side wireless terminal further includes measuring means for measuring the volume of traffic of sending data. When the volume of traffic measured is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, one wireless terminal as a base station further includes: detecting means for detecting a topology change of the multihop radio network; expecting means for expecting the traffic from the topology change detected by the detecting means; determining means for determining the intermittent receive period and the preamble length of data of the wireless terminals constituting the multihop radio network on the basis of the traffic expected by the expecting means; and informing means for informing the wireless terminals constituting the multihop radio network of the intermittent receive period and the preamble length of data determined by the determining means, each of the wireless terminals constituting the multihop radio network includes receiving means for receiving the information on the intermittent receive period and the preamble length of data from the base station, and the wireless terminals constituting the multihop radio network change the intermittent receive period and the preamble length on the basis of the information received by the receiving means.

In another aspect of the radio communication system, the receiving side wireless terminal further includes: detecting means for detecting a topology change of the multihop radio network; and expecting means for expecting the volume of traffic received by the receiving side wireless terminal from the topology change detected by the detecting means. When the volume of traffic expected by the expecting means is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, the sending side wireless terminal further includes: detecting means for detecting a topology change of the multihop radio network; and expecting means for expecting the volume of traffic sent from the sending side wireless terminal from the topology change detected by the detecting means. When the volume of traffic expected by the expecting means is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, one wireless terminal as a base station further includes: clock means for clocking the time; determining means for determining the intermittent receive period and the preamble length of data of the wireless terminals constituting the multihop radio network on the basis of the time obtained by the clock means; and informing means for informing the wireless terminals constituting the multihop radio network of the intermittent receive period and the preamble length of data determined by the determining means, each of the wireless terminals constituting the multihop radio network includes receiving means for receiving the information on the intermittent receive period and the preamble length of data from the base station, and the wireless terminals constituting the multihop radio network change the intermittent receive period and the preamble length on the basis of the change information received by the receiving means.

In another aspect of the radio communication system, each of the wireless terminals constituting the multihop radio network further include: clock means for clocking the time; and determining means for determining the intermittent receive period and the preamble length of data of the wireless terminal on the basis of the time obtained by the clock means.

In another aspect of the radio communication system, the receiving side wireless terminal further includes: a clock; expecting means for expecting the volume of traffic received by the receiving side wireless terminal which varies according to the time; and expecting means for expecting the volume of traffic received by the receiving side wireless terminal from the present time. When the volume of traffic expected is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, the sending side wireless terminal further includes: a clock; expecting means for expecting the volume of traffic sent from the sending side wireless terminal which varies according to the time; and expecting means for expecting the volume of traffic sent from the sending side wireless terminal from the present time. When the volume of traffic expected is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, the sending side wireless terminal further includes: detecting means for detecting the occurrence of an event; and expecting means for expecting the volume of traffic sent from the sending side wireless terminal from the occurrence of an event detected. When the volume of traffic expected is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect of the radio communication system, the wireless terminal further includes: detecting means for detecting the battery remaining power; and determining means for determining the intermittent receive period and the preamble length of the wireless terminals according to the battery remaining power detected.

In another aspect of the radio communication system, the receiving side wireless terminal further includes detecting means for detecting the battery remaining power. When the battery remaining power detected is larger than a predetermined upper limit value, the intermittent receive period of the receiving side wireless terminal and the preamble length of data of the sending side wireless terminal are shortened and, when the battery remaining power is smaller than a predetermined lower limit value, the intermittent receive period of the receiving side wireless terminal and the preamble length of data of the sending side wireless terminal are extended.

In another aspect of the radio communication system, each wireless terminal further includes: monitoring means for monitoring at least one of the time, a topology change of the multihop radio network and the received traffic, transmitted traffic, occurrence of an event and battery remaining power of one or more wireless terminals constituting the multihop radio network; monitor information sending means for sending information monitored by the monitoring means to a specific wireless terminal in the multihop radio network; and setting information receiving means for receiving setting information on at least one of the intermittent receive period and the preamble length of data from the specific wireless terminal, the specific wireless terminal includes: change information receiving means for receiving change information from each wireless terminal; determining means for determining setting information on at least one of the intermittent receive period and the preamble length of data of each wireless terminal on the basis of the change information; and setting information sending means for sending the setting information to each wireless terminal, and the wireless terminal sets the intermittent receive period and the preamble length of data of each wireless terminal on the basis of the setting information.

In accordance with a further aspect of the present invention, there is provided a wireless terminal constituting a radio communication system of a multihop radio network including a plurality of wireless terminals, comprising: network characteristics detecting means for detecting characteristics of the multihop radio network; intermittent receive period setting means; and preamble length changing means, wherein when the network characteristics detecting means detects a change of the characteristics of the network, the intermittent receive period setting means changes the intermittent receive period, and the preamble changing means changes the preamble length of data.

In another aspect of the wireless terminal, the characteristics depend on a change in traffic, network topology, time, battery remaining power of the wireless terminals or occurrence of an event.

In another aspect, the wireless terminal further includes monitoring means for monitoring the traffic of the multihop radio network; determining means for determining the intermittent receive period and the preamble length of data of the wireless terminals constituting the multihop radio network on the basis of the traffic monitored by the monitoring means; and informing means for informing the wireless terminals constituting the multihop radio network of the intermittent receive period and the preamble length of data determined by the determining means.

In another aspect, the wireless terminal further includes detecting means for detecting a topology change of the multihop radio network; expecting means for expecting the traffic from the topology change detected by the detecting means; determining means for determining the intermittent receive period and the preamble length of data of the wireless terminals constituting the multihop radio network on the basis of the traffic expected by the expecting means; and informing means for informing the wireless terminals constituting the multihop radio network of the intermittent receive period and the preamble length of data determined by the determining means.

In another aspect, the wireless terminal further includes clock means for clocking the time; determining means for determining the intermittent receive period and the preamble length of data of the wireless terminals constituting the multihop radio network on the basis of the time obtained by the clock means; and informing means for informing the wireless terminals constituting the multihop radio network of the intermittent receive period and the preamble length of data determined by the determining means.

In another aspect, the wireless terminal further includes receiving means for receiving information on the battery remaining power from another wireless terminal; determining means for determining the intermittent receive period and the preamble length of data of the wireless terminals constituting the multihop radio network on the basis of the battery remaining power of another wireless terminal; and informing means for informing the wireless terminals constituting the multihop radio network of the intermittent receive period and the preamble length of data determined by the determining means.

In another aspect, the wireless terminal further includes receiving means for receiving information on the occurrence of an event from another wireless terminal; determining means for determining the intermittent receive period and the preamble length of data of the wireless terminals constituting the multihop radio network on the basis of the occurrence of an event informed by another wireless terminal; and informing means for informing the wireless terminals constituting the multihop radio network of the intermittent receive period and the preamble length of data determined by the determining means.

In another aspect, the wireless terminal further includes receiving means for receiving setting information on the intermittent receive period and the preamble length of data from another wireless terminal, wherein the wireless terminals constituting the multihop radio network change the intermittent receive period and the preamble length on the basis of the setting information received.

In another aspect, the wireless terminal further includes detecting means for detecting at least one of the traffic, the topology change, the battery remaining power and the occurrence of an event, and informs the other wireless terminals of the information detected by the detecting means.

In another aspect, the wireless terminal further includes preamble length change requesting means for requesting the other wireless terminals to change the preamble length of data according to the change of the intermittent receive period.

In another aspect, the wireless terminal further includes intermittent receive period change requesting means for requesting the other wireless terminals to change the intermittent receive period according to the change of the preamble length of data.

In another aspect, the wireless terminal further includes receiving means for receiving a preamble length change request from another wireless terminal, and changes the preamble length of data on the basis of the preamble length change request received.

In another aspect, the wireless terminal further includes receiving means for receiving an intermittent receive period change request from another wireless terminal, and changes the intermittent receive period on the basis of the intermittent receive period change request received.

In another aspect, the wireless terminal further includes measuring means for measuring the volume of traffic received. When the volume of traffic received is larger than a predetermined upper limit value, the intermittent receive period is shortened and, when the volume of traffic is smaller than a predetermined lower limit value, the intermittent receive period is extended.

In another aspect, the wireless terminal further includes measuring means for measuring the volume of traffic transmitted. When the volume of traffic transmitted is larger than a predetermined upper limit value, the preamble length of data is shortened and, when the volume of traffic is smaller than a predetermined lower limit value, the preamble length of data is extended.

In another aspect, the wireless terminal further includes detecting means for detecting a topology change and expecting means for expecting the volume of traffic received according to the topology change. When the volume of traffic expected is larger than a predetermined upper limit value, the intermittent receive period is shortened and, when the volume of traffic is smaller than a predetermined lower limit value, the intermittent receive period is extended.

In another aspect, the wireless terminal further includes detecting means for detecting a topology change and expecting means for expecting the volume of traffic transmitted according to the topology change. When the volume of traffic expected is larger than a predetermined upper limit value, the preamble length of data is shortened and, when the volume of traffic is smaller than a predetermined lower limit value, the preamble length of data is extended.

In another aspect, the wireless terminal further includes clock means for clocking the time and expecting means for expecting the volume of traffic received according to the time change. When the volume of traffic expected is larger than a predetermined upper limit value, the intermittent receive period is shortened and, when the volume of traffic is smaller than a predetermined lower limit value, the intermittent receive period is extended.

In another aspect, the wireless terminal further includes clock means for clocking the time and expecting means for expecting the volume of traffic transmitted according to the time change. When the volume of traffic expected is larger than a predetermined upper limit value, the preamble length of data is shortened and, when the volume of traffic is smaller than a predetermined lower limit value, the preamble length of data is extended.

In another aspect, the wireless terminal further includes detecting means for detecting the occurrence of an event and expecting means for expecting the volume of traffic sent from the sending side wireless terminal from the occurrence of an event detected. When the volume of traffic expected is larger than a predetermined upper limit value, the intermittent receive period of the receiving side wireless terminal and the preamble length of data of the sending side wireless terminal are shortened and, when the volume of traffic is smaller than a predetermined lower limit value, the intermittent receive period of the receiving side wireless terminal and the preamble length of data of the sending side wireless terminal are extended.

In another aspect, the wireless terminal further includes detecting means for detecting the battery remaining power. When the battery remaining power detected is larger than a predetermined upper limit value, the intermittent receive period of the receiving side wireless terminal and the preamble length of data of the sending side wireless terminal are shortened and, when the battery remaining power is smaller than a predetermined lower limit value, the intermittent receive period of the receiving side wireless terminal and the preamble length of data of the sending side wireless terminal are extended.

In another aspect, the wireless terminal further includes receiving means for receiving setting information on at least one of the intermittent receive period and the preamble length from a specific wireless terminal, and changes at least one of the intermittent receive period and the preamble length on the basis of the setting information received from the specific wireless terminal.

In another aspect, the wireless terminal further includes monitoring means for monitoring at least one of the time, the topology change of the multihop radio network and the received traffic, transmitted traffic, occurrence of an event and battery remaining power of one or more wireless terminals constituting the multihop radio network, and sending means for sending the information monitored by the monitoring means to the specific wireless terminal in the multihop radio network.

In another aspect, the wireless terminal further includes determining means for determining setting information on at least one of the intermittent receive period and the preamble length of the wireless terminals except the wireless terminal itself and sending means for sending the setting information to the wireless terminals except the wireless terminal itself.

In another aspect, the wireless terminal further includes receiving means for receiving information on the change of at least one selected from the topology of the multihop radio network, received traffic, transmitted traffic, the occurrence of an event and battery remaining power from the wireless terminals except the wireless terminal itself; determining means for determining setting information on at least one of the intermittent receive period and the preamble length of data of each wireless terminal on the basis of the change information; and sending means for sending the setting information to the respective wireless terminals.

According to the present invention, in a multihop radio network including a plurality of wireless terminals, by changing an intermittent receive period and the preamble length of data of the respective wireless terminals based on a traffic change, a network topology change, a time change, a battery remaining power change and the occurrence of an event (or a characteristic change), power consumption can be reduced according to network characteristics and a network having a high degree of flexibility can be constructed.

Thus, a radio communication method, a radio communication system and a wireless terminal for realizing low power consumption and the flexibility of the network can be provided.

BRIEF DESCRIPTION OF THE DRAWINGS

The objects, features and advantages of the present invention will become more apparent from the consideration of the following detailed description, taken in conjunction with the accompanying drawings, in which:

FIG. 1 is a block diagram showing the structure of a multihop radio network according to an embodiment of the present invention;

DESCRIPTION OF THE PREFERRED EMBODIMENTS

Figure 2:
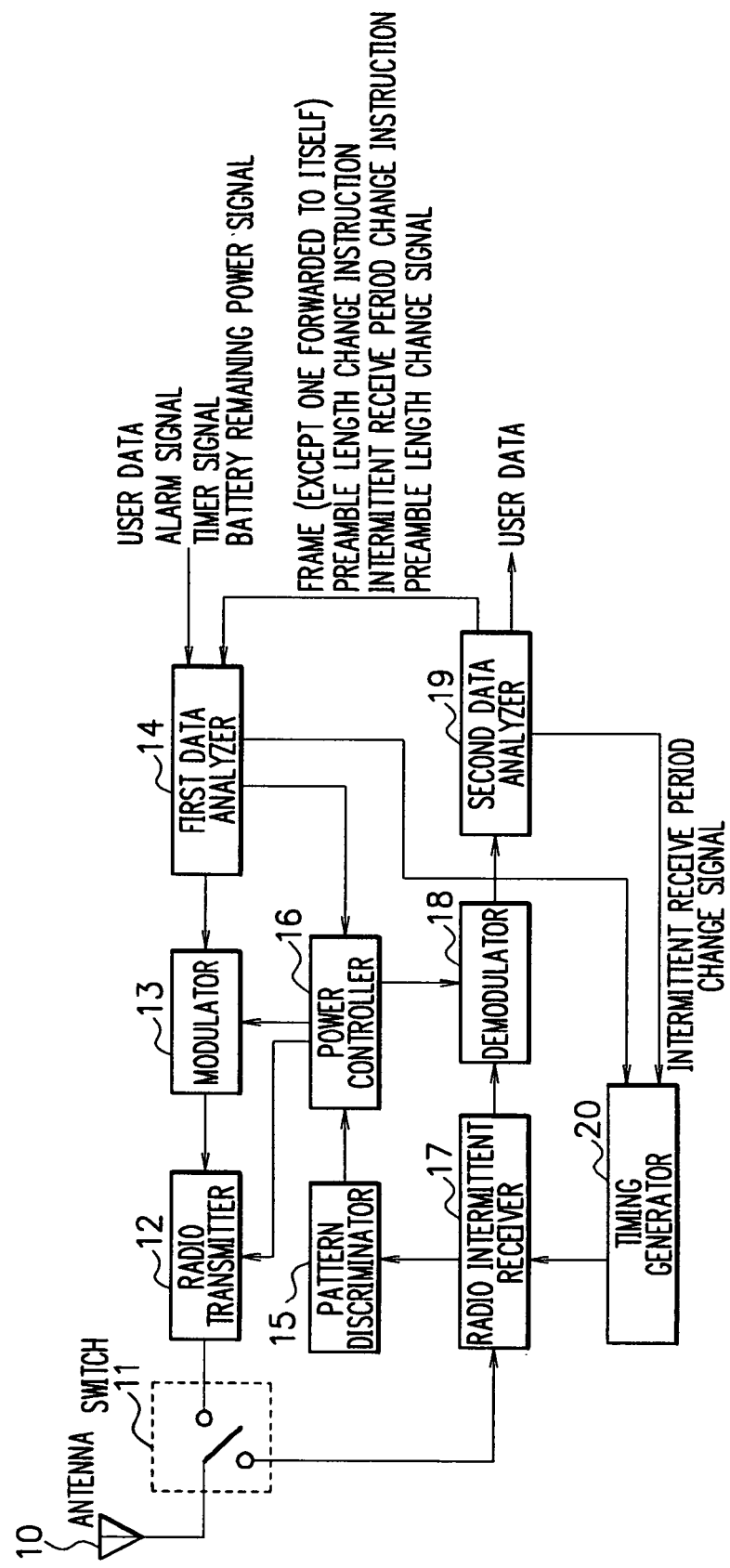
FIG. 2 is a block diagram showing the structure of a wireless terminal depicted in FIG. 1.

Referring now to the drawings, a description of preferred embodiments of the present invention will be given in detail.

In a multihop radio network where data are transferred in such a manner as to pass a bucket or packet from one wireless terminal to another, an intermittent receive period of the wireless terminals and the preamble length of data are changed according to a traffic change caused by an increase or a decrease in data amount or a data type change, a network topology change caused by the addition or deletion of a wireless terminal, a time change on a timer or the like, a change in battery remaining power or the occurrence of an event caused by an alarm signal or the like.

FIG. 1 is a block diagram showing the structure of a multihop radio network according to an embodiment of the present invention.

Referring to FIG. 1, the multihop radio network includes a base station 2 and a plurality of wireless terminals 3 to 7 (not restricted to 5 terminals). A network 1 is connected to the base station 2 through a wire or a fixed line as shown by a solid line, and the base station 2 is connected to the wireless terminals 3 to 7 by wireless as shown by broken lines. Between two of the wireless terminals 3 to 7 and the base station 2, data is transferred in such a manner as to pass a bucket or packet from one wireless terminal to another or the base station. For example, when the wireless terminal 5 forwards data to the base station 2, the wireless terminal 3 necessarily relays the data. In this case, it is assumed that the wireless terminals 3 to 7 are connected to the base station 2 in a tree or mesh structure. In this description, the base station is a wireless terminal which can connect a multihop network and another network or function as a root of a multihop radio network.

The wireless terminals 3 to 7 each carry out data communication in their distributed locations and hence sending and receiving of data. The wireless terminals 3 and 4 locate in their interconnecting positions and necessarily relay the data to realize the data communication between the base station 2 and the wireless terminals 5 to 7. That is, the wireless terminals 5 to 7 locate in end positions of the network and conduct data communication only in their locations, while the wireless terminals 3 and 4 in intermediary positions carry out not only data communication but also data relays in their locations.

In this case, although a wide range of areas can be covered by multihops, the wireless terminals 3 and 4 positioned in their interconnecting locations perform data relay operation, and their power consumption increases due to the data relay operation as compared to the other wireless terminals 5 to 7. Besides, it is assumed that the base station 2 uses an external power supply such as an alternating current (AC) power source. On the other hand, the wireless terminals 3 to 7 do not use the AC power source but use an internal power supply such as solar batteries, primary batteries, secondary batteries, fuel batteries, and capacitors or condensers (e.g. electric double layer capacitors). Naturally, the base station 2 may use the internal power supply and the wireless terminals 3 to 7 may use the external power supply.

The base station 2 and the wireless terminals 3 to 7 are characterized by performing intermittent receive operation to reduce the power consumption as low as possible. More specifically, the receiving side of the base station or the wireless terminal is activated per a period T (e.g. 100 milliseconds, 1 second, 10 seconds or the like), stops its receiving operation when not receiving radio signals and maintains its receiving operation when receiving radio signals until a sending party completes the transmission of radio signals.

On the other hand, the sending side of the base station or the wireless terminal sets a preamble length of radio signals to at least the period T so that the other party on the receiving side does not fail to receive the radio signals. The period T is variable between each linked pair of the base station 2 and the wireless terminals 3 to 7, and a match between an intermittent receive period of the receiving side and the preamble length of data of the sending side is necessarily accomplished before communication.

FIG. 2 is a block diagram showing the structure of the respective wireless terminals 3 to 7.

As can be seen in FIG. 2, each of the wireless terminals 3 to 7 includes an antenna 10, a switch 11 for selecting one of sending and receiving, a radio transmitter 12, a modulator 13, a first data analyzer 14, a pattern discriminator 15, a power controller 16, a radio intermittent receiver 17, a demodulator 18, a second data analyzer 19 and a timing generator 20. In addition, each of the wireless terminals 3 to 7 further includes a memory (not shown) for temporarily storing data received to perform relay operation.

In each of the wireless terminals 3 to 7, a sending side terminal includes the radio transmitter 12, the modulator 13 and the first data analyzer 14 and a receiving side terminal includes the radio intermittent receiver 17, the demodulator 18, the second data analyzer 19, the timing generator 20 and the memory.

In the wireless terminals 3 to 7, when data is received, the switch 11 is connected to a receiving terminal (the lower terminal in FIG. 2) and radio signals received from the antenna 10 are sent to the radio intermittent receiver 17 via the switch 11.

The radio intermittent receiver 17 is activated per the period T by an activation signal periodically fed from the timing generator 20 to detect the receiving of radio signals, and stops its receiving operation when not receiving the radio signals. When receiving the radio signals, the radio intermittent receiver 17 sends the received signals to the pattern discriminator 15.

The pattern discriminator 15 compares voltages (signal values) of the received signals with predetermined expected values to determine whether or not the received signals are effective. For instance, the pattern discriminator 15 necessarily compares a preamble for synchronization per one bit unit and a synchronizing code for frame synchronization with respective expected values. When having determined that the radio signals received are effective, the pattern discriminator 15 sends a power-on instruction to the power controller 16. The pattern discriminator 15 also sends a power-off instruction to the power controller 16 when the receiving of the radio signals from the sending party is completed.

The power controller 16 carries out a power-on or a power-off of the radio transmitter 12, the modulator 13 and the demodulator 18 by an instruction sent from the pattern discriminator 15 or the first data analyzer 14. When receiving the effective radio signal, the power controller 16 turns on the power of the demodulator 18. When receiving the radio signal from the radio intermittent receiver 17, the demodulator 18 demodulates the radio signal to send a frame to the second data analyzer 19.

The second data analyzer 19 determines whether or not the received frame is forwarded to the wireless terminal itself, for example, the wireless terminal 3. When the received frame is not directed to the wireless terminal 3 but to the base station 2 or another wireless terminal (in this case, the wireless terminal 5 or 6), the second data analyzer 19 sends the received frame to the first data analyzer 14 to transfer the received frame to the base station 2 or the wireless terminal 5 or 6.

When the received frame is forwarded to the wireless terminal 3, the second data analyzer 19 analyzes the data contained in the frame. When the analyzed data is user data, the second data analyzer 19 sends the frame to a subsequent stage. When the analyzed data is control data, the second data analyzer 19 conducts the following processing according to its contents. Examples of the control data include intermittent receive period change instruction data for instructing a change of an intermittent receive period between respective linked pairs of the wireless terminal (in this case, the wireless terminal 3), preamble length change instruction data for instructing a change of a preamble length of a sending frame, wireless terminal addition or deletion information data for informing the addition or deletion of a wireless terminal (in this case, the wireless terminal 5 or 6), battery remaining power information data for informing a battery remaining power, and alarm information data for informing an alarm signal detected in the wireless terminal (in this case, the wireless terminal 5 or 6).

When the control data forwarded to the wireless terminal 3 is the intermittent receive period change instruction data, the second data analyzer 19 sends an intermittent receive period change signal to the timing generator 20. When the control data directed to the wireless terminal 3 is the preamble length change instruction data, the second data analyzer 19 sends a preamble length change signal to the first data analyzer 14. Similarly, in the case of the wireless terminal addition information data, the wireless terminal deletion information data and the battery remaining power information data, the second data analyzer 19 recalculates a proper period T between each linked pair of the base station 2 and the wireless terminals 3 to 7 or in the entire network to send, for instance, an intermittent receive period change signal to the timing generator 20 or a preamble length change signal to the first data analyzer 14.

Further, the second data analyzer 19 checks destinations and sending sources of all frames received and data types such as user data and control data, and counts the frequency or number of times of respective data. The second data analyzer 19 recalculates a period T based on the obtained frequency or number of times of certain data. In the case of changing of its own period T, the second data analyzer 19 sends an intermittent receive period change signal to the timing generator 20 and a preamble length change signal to the first data analyzer 14. Furthermore, when instructing the base station 2 and the other wireless terminals 3 to 7 to change a period T, the second data analyzer 19 sends an intermittent receive period change instruction or a preamble length change instruction to the first data analyzer 14.

The first data analyzer 14 receives user data received in its location, an alarm signal detected in its location, a timer signal indicating a certain time and battery remaining power signals for informing remaining power of batteries mounted on the other wireless terminals 4 to 7, and also receives the frames except one forwarded to itself, the preamble length change signal for changing a preamble length for use in sending, the preamble length change signal for instructing the base station 2 and the other wireless terminals 4 to 7 to change the length of preamble and the intermittent receive period change signal for instructing the base station 2 and the other wireless terminals 4 to 7 to change an intermittent receive period from the second data analyzer 19. The first data analyzer 14 sends the frames and the signals received from the second data analyzer 19 in addition to the user data received in its location, the alarm signal detected in its location, the battery remaining power signals, the preamble length change instruction, the intermittent receive period change instruction and the destination information to the modulator 13.

The first data analyzer 14 instructs the power controller 16 to turn off the power when the frame sending is finished. When receiving frames except one directed to itself, the first data analyzer 14 operates in the same manner as described above and sends the frames untouched to the modulator 13 without changing the destination information.

When receiving a timer signal, the first data analyzer 14 sends the intermittent receive period change signal to the timing generator 20 to change the period T scheduled with respect to each time, and changes the preamble length of the frame to be transmitted thereafter. In this case, it is assumed that the period T is previously determined with respect to each time between each linked two of the base station 2 and the wireless terminals 3 to 7.

When receiving the preamble length change signal, the first data analyzer 14 changes the preamble length of the frame to be transmitted thereafter. The first data analyzer 14 checks various signals including the alarm signal detected in its location and the battery remaining power to monitor their frequencies. The first data analyzer 14 recalculates the period T using the frequencies. When changing its own period T, the first data analyzer 14 sends the intermittent receive period change signal to the timing generator 20 and changes the preamble length of the frame to be transmitted thereafter.

The user data and the control data described above are not necessarily sent and received by an independent frame. The user data and the control data can be defined by the same frame. The modulator 13 modulates the frames received from the first data analyzer 14 after power-on, and sends the radio signals to the radio transmitter 12. In sending data, the switch 11 is connected to a sending terminal (a right upper terminal in FIG. 2) and the radio signals sent from the radio transmitter 12 are transmitted from the antenna 10 via the switch 11.

The timing generator 20 changes the period T on the basis of the intermittent receive period change signal received from the first or second data analyzer 14 or 19, and informs the radio intermittent receiver 17 of the timing of intermittent receive operation.

Figure 3:
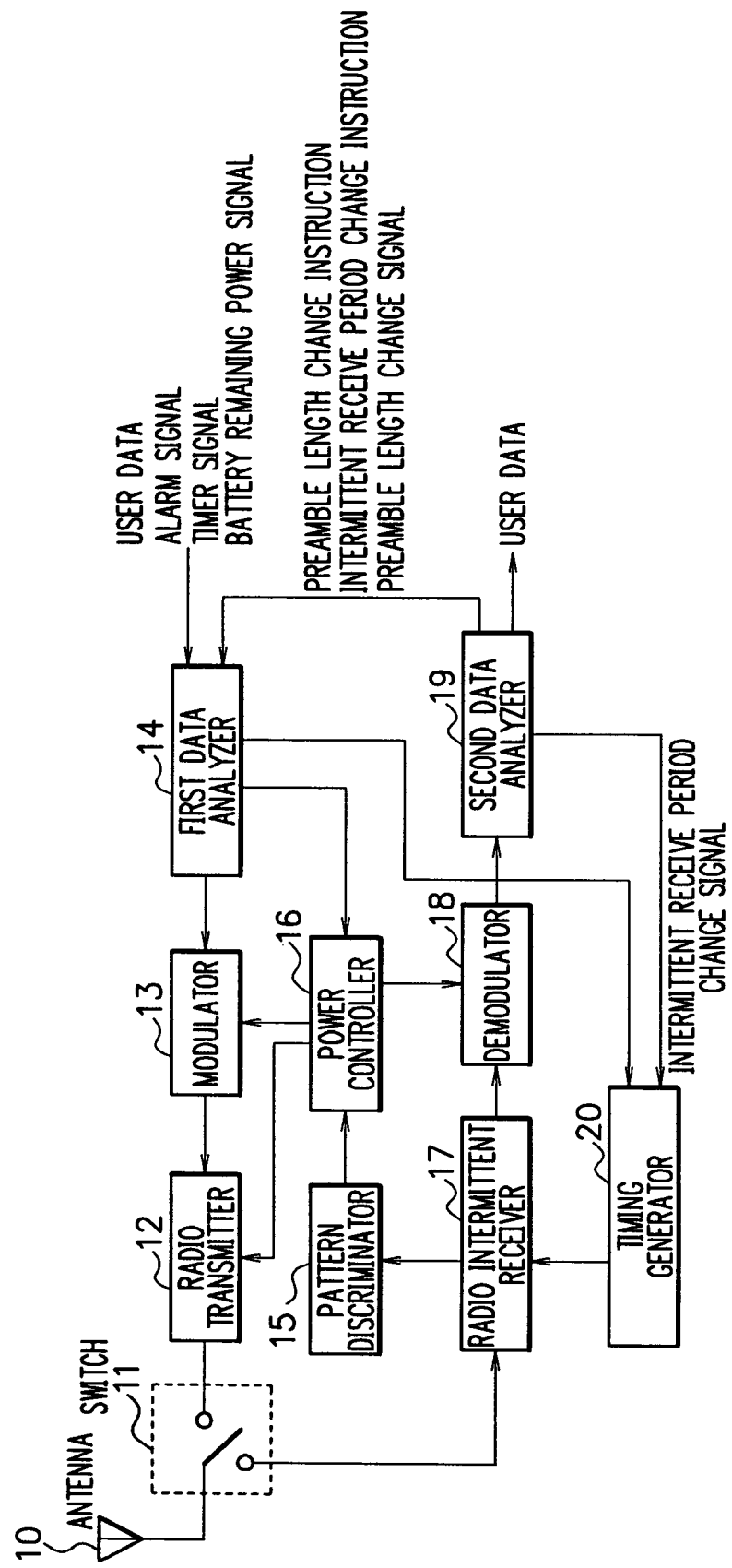
FIG. 3 is a block diagram showing the structure of a base station depicted in FIG. 1.

FIG. 3 is a block diagram showing the structure of the base station 2.

The base station 2 has the basically same structure as described previously for the wireless terminals 3 to 7 except that the base station 2 has no relay function for user data. In other words, in the base station 2, a second data analyzer 19 never sends the user data to a first data analyzer 14. Besides, since the base station 2 can readily grasp the states of all the wireless terminals 3 to 7, the base station 2 calculates a period T between each linked pair considering their states and can optimize the entire network.

Figure 4:
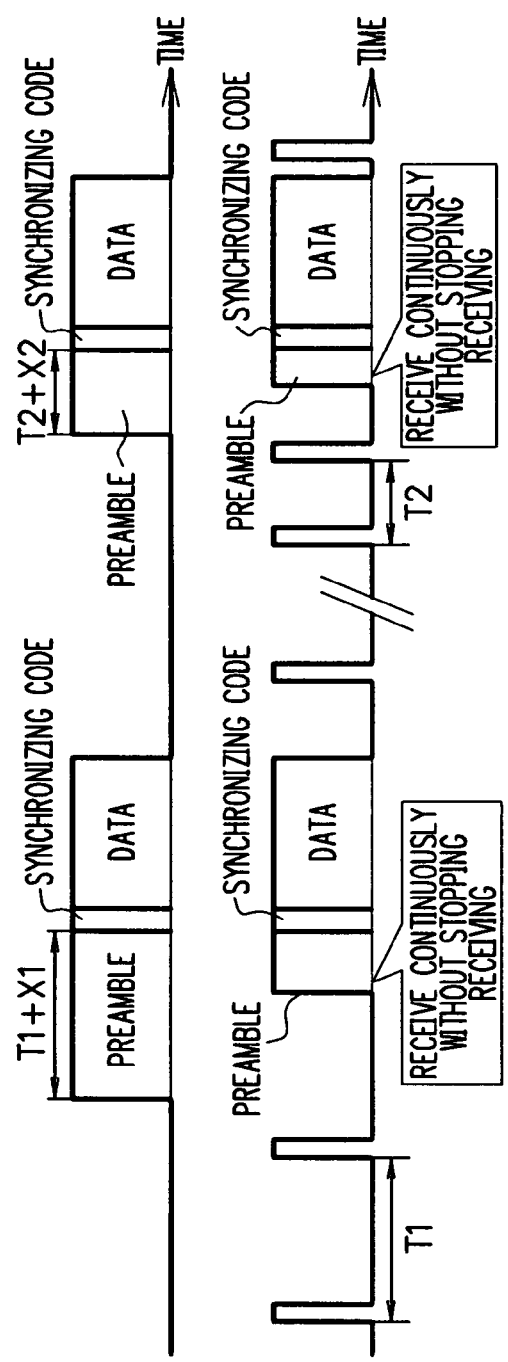
FIG. 4A is a diagram showing the data sending timing of a radio transmitter depicted in FIG. 2 or FIG. 3.
FIG. 4B is a diagram showing the data receiving timing of a radio intermittent receiver depicted in FIG. 2 or FIG. 3.

FIG. 4A is a diagram showing the data sending timing, and FIG. 4B is a diagram showing the data receiving timing.

In FIG. 4A, the output of a radio transmitter is taken in the vertical direction and in FIG. 4B, the input of a radio intermittent receiver is taken in the vertical direction. In FIGS. 4A and 4B, time is taken in the horizontal direction.

In FIG. 4A, a preamble length on a sending side is changed from T1+X1 to T2+X2 and in FIG. 4B, an intermittent receive period on a receiving side is changed from T1 to T2 at some midpoint. In this case, X1 and X2 are margins for the receiving side to receive data absolutely and are necessarily set to values enough to absorb the jitters of respective clocks of the respective base station 2 and the wireless terminals 3 to 7. Each frame includes data containing a preamble for synchronizing one bit unit, a synchronizing code for frame synchronization, user data, control data, destination information, sending source information and the like.

In the following, the operation of the radio communication system according to the first embodiment will be described.

In this embodiment, a period T is changed according to a change in the volume of traffic due to an increase and a decrease in data amount, a data type change, or the like.

In order that the base station 2 and the wireless terminals 3 to 7 send and receive frames, it is necessary to correspond an intermittent receive period on a receiving side to a preamble length on a sending side between each linked two of the terminals. Now, look at the wireless terminals 3, 5 and 6, the wireless terminal 3 sends and receives data in its location and sends and receives radio signals to/from the base station 2 and the wireless terminals 5 and 6. The wireless terminals 5 and 6 also send and receive data in their locations and send and receive radio signals to/from the wireless terminal 3.

The case of sending radio signals from the wireless terminal 5 to the wireless terminal 3 will be described hereinafter in all the embodiments of the present invention. In this case, although it is necessary that an intermittent receive period is changed in the wireless terminal 3 and a preamble length of a sending frame is changed to at least the intermittent receive period in the base station 2 and the wireless terminals 5 and 6 (when the preamble length in the base station 2 and the wireless terminals 5 and 6 is longer than the intermittent receive period of the wireless terminal 3, if the three preamble lengths are different from one another, there is no problem in communications), only the case where the intermittent receive period is changed in the wireless terminal 3 and the preamble length of the sending frame is changed in the wireless terminal 5 will be described hereinafter.

The transmission of radio signals from the wireless terminal 3 to the wireless terminal 5 and communications between two of the base station 2 and the other wireless terminals will be readily understood in the same manner as described below.

Figure 5:
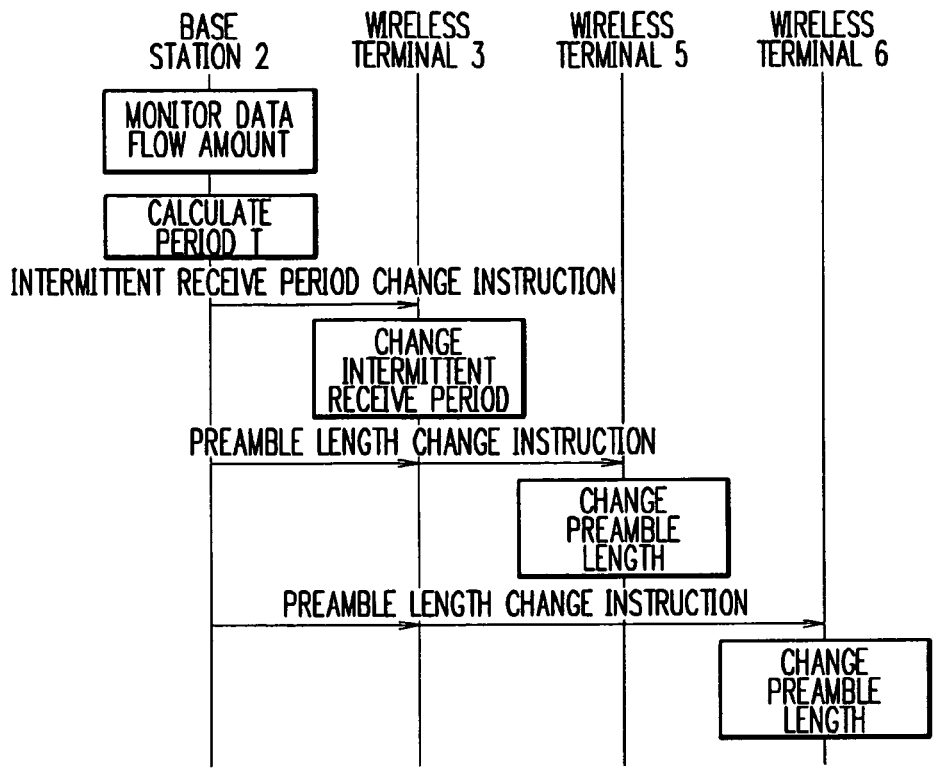
FIG. 5 is a chart showing a procedure for changing a period T according to a traffic change using the base station.

FIG. 5 is a chart showing a procedure for changing a period T according to a traffic change using the base station.

The base station 2 checks destinations and sending sources of all frames received and data types such as user data and control data, and measures the frequency or number of times of respective data with respect to a combination of the destination and the sending source. When a frequency or number of times of certain data exceeds a certain threshold value, the base station 2 recalculates a period T, and sends an intermittent receive period change signal to the wireless terminal 3 and a preamble length change signal to the wireless terminals 5 and 6. As a result, the wireless terminal 3 carries out the intermittent receiving operation based on the specified period T, and the wireless terminals 5 and 6 change a preamble length on the basis of the specified period T.

In the case where the wireless terminal 3 receives data from a plurality of wireless terminals and the wireless terminals request different intermittent signal receive periods, the wireless terminal 3 stores the different intermittent signal receive periods required by the wireless terminals to set the minimum value of the different intermittent signal receive periods as the intermittent signal receive period. Further, when the wireless terminals 5 and 6 send data to a plurality of wireless terminals and the wireless terminals request different preamble lengths, the following two methods can be used. First, the different preamble lengths for the wireless terminals are stored and the maximum value of the different preamble lengths is employed as the preamble length. Second, the preamble length is changed with respect to each wireless terminal at a destination. In this case, since a direction in which the wireless terminal 5 sends the radio signals to the wireless terminal 3 is considered, the base station 2 can learn the volume of traffic in a multihop radio sensor network by checking all frames received from the multihop radio sensor network. On the other hand, as to the other direction in which the wireless terminal 3 sends the radio signals to the wireless terminal 5, the base station 2 can learn the volume of traffic in the multihop radio sensor network by checking all frames received from the network 1.

Figure 6:
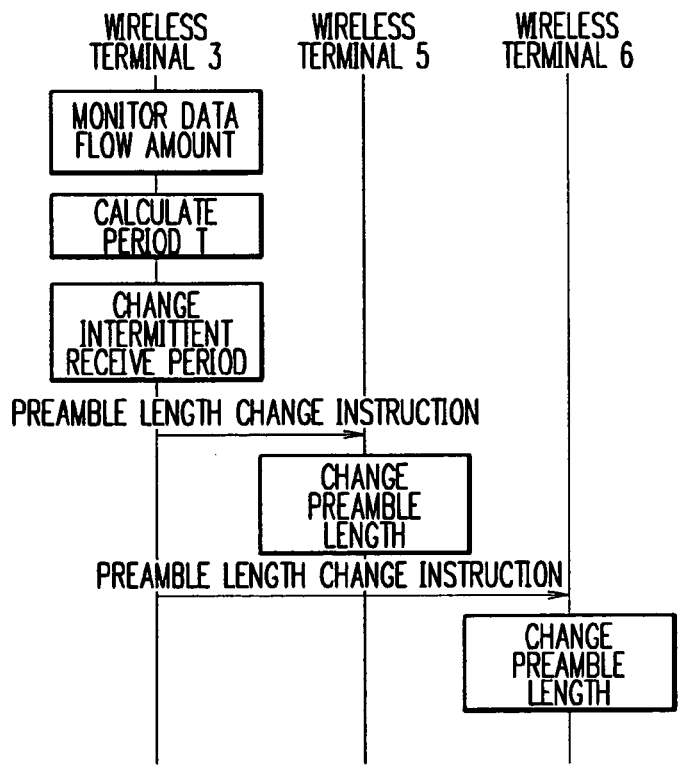
FIG. 6 is a chart showing a procedure for changing a period T according to a traffic change in a receiving side-led manner.

FIG. 6 is a chart showing a procedure for changing a period T according to a traffic change in a receiving side-led manner.

The wireless terminal 3 checks destinations and sending sources of all frames received from the base station 2 and the wireless terminals 5 and 6 and data types such as user data and control data, and measures the frequency or number of times of respective data with respect to a combination of the destination and the sending source. When the frequency or number of times of certain data exceeds a certain threshold value, the wireless terminal 3 recalculates a period T to change its own intermittent receive period, and sends a preamble length change signal to the wireless terminals 5 and 6. As a result, the wireless terminal 3 carries out the intermittent receiving operation based on the calculated period T and the wireless terminals 5 and 6 change a preamble length on the basis of the specified period T.

Figure 7:
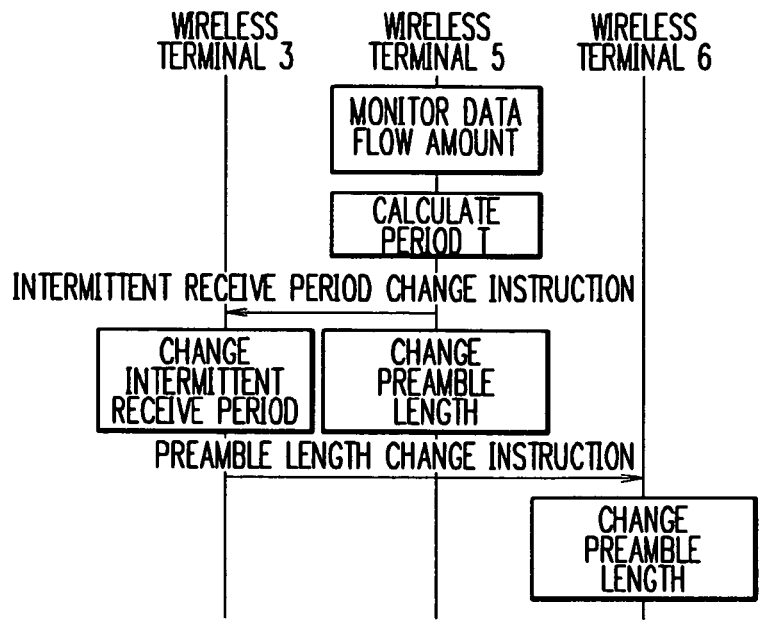
FIG. 7 is a chart showing a procedure for changing a period T according to a traffic change in a sending side-led manner.

FIG. 7 is a chart showing a procedure for changing a period T according to a traffic change in a sending side-led manner.

The wireless terminal 5 checks user data received in its location, and various signals such as an alarm signal detected in its location and battery remaining power signals, destinations and sending sources of all frames received from downstream wireless terminals (not shown), and data types such as user data and control data. Then, the wireless terminal 5 measures the frequency or number of times of respective data with respect to a combination of the destination and the sending source. When the frequency or number of times of certain data exceeds a certain threshold value, the wireless terminal 5 recalculates a period T to change its own preamble length, and sends an intermittent receive period change signal to the wireless terminal 3. The wireless terminal 3 sends a preamble length change signal to the wireless terminal 6. As a result, the wireless terminal 3 carries out the intermittent receiving operation based on the calculated period T, and the wireless terminals 5 and 6 change a preamble length on the basis of the specified period T.

In this embodiment, examples of the calculation to obtain the period T according to the traffic change include the following.

When the base station 2 or the wireless terminal 3 or 4 once detects various signals such as an alarm signal in its location or once receives a frame bearing an alarm signal detected in the wireless terminals 5 to 7, in order to minimize delay time between sending sources and destinations by raising sensitivity of receiving operation, the period T is shortened so that the alarm signal may be communicated to the base station 2 or the wireless terminal 3 or 4 as soon as possible. When user data to be sent from the wireless terminals 5 to 7 to the base station 2 or the wireless terminal 3 or 4 is increased, the period T can be shortened so that the user data may be received by the base station 2 or the wireless terminal 3 or 4 as much as possible without being discarded on its way. Further, when user data to be sent from the wireless terminals 5 to 7 to the base station 2 or the wireless terminal 3 or 4 is reduced, in order to reduce power consumption as low as possible by reducing the frequency of the intermittent receiving of data in the base station 2, the period T can be extended.

In the following, the operation of the radio communication system according to the second embodiment will be described.

In this embodiment, a period T is changed when the expected volume of traffic changes due to a change in network topology caused by the addition or deletion of a wireless terminal to/from the network.

Figure 8:
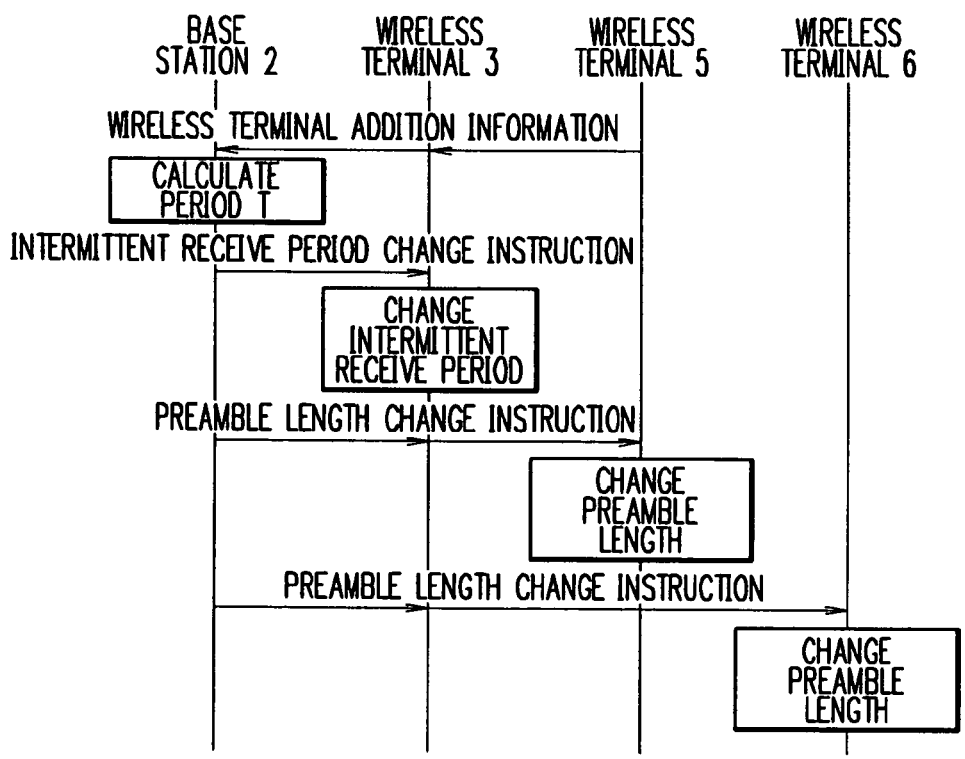
FIG. 8 is a chart showing a procedure for changing a period T according to the addition of a wireless terminal to the network using the base station.

FIG. 8 is a chart showing a procedure for changing a period T according to the addition of a wireless terminal to the network using the base station.

When a new wireless terminal 5 is added to the multihop radio network, the wireless terminal 5 sends a wireless terminal addition information signal to the base station 2. When receiving the wireless terminal addition information signal, the base station 2 recalculates a period T, and sends an intermittent receive period change signal to the wireless terminal 3 and a preamble length change signal to the wireless terminals 5 and 6. As a result, the wireless terminal 3 carries out the intermittent receiving operation based on the specified period T, and the wireless terminals 5 and 6 change a preamble length on the basis of the specified period T.

Figure 9:
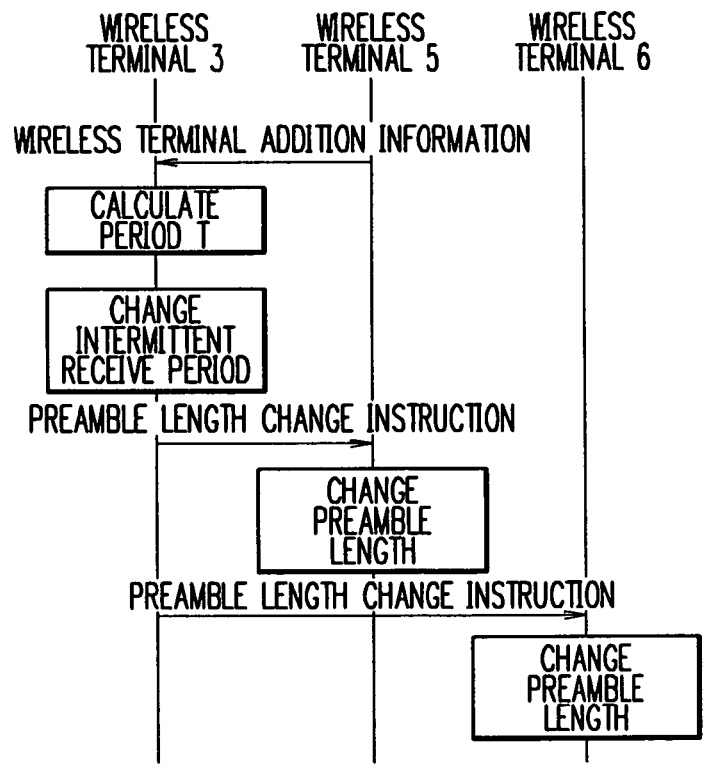
FIG. 9 is a chart showing a procedure for changing a period T according to the addition of a wireless terminal to the network without using the base station.

FIG. 9 is a chart showing a procedure for changing a period T according to the addition of a wireless terminal to the network without using the base station.

In this case, since the wireless terminal 5 sends radio signals to the wireless terminal 3, a period T is changed in a receiving side-led manner. On the other hand, when the wireless terminal 3 sends the radio signals to the wireless terminal 5, the period T is changed in a sending side-led manner.

When a new wireless terminal 5 is added to the multihop radio network, the wireless terminal 5 sends a wireless terminal addition information signal to the wireless terminal 3. When receiving the wireless terminal addition information signal, the upstream wireless terminal 3 recalculates a period T to change its own intermittent receive period, and sends a preamble length change signal to the wireless terminals 5 and 6. As a result, the wireless terminal 3 carries out the intermittent receiving operation based on the calculated period T, and the wireless terminals 5 and 6 change a preamble length on the basis of the specified period T.

Figure 10:
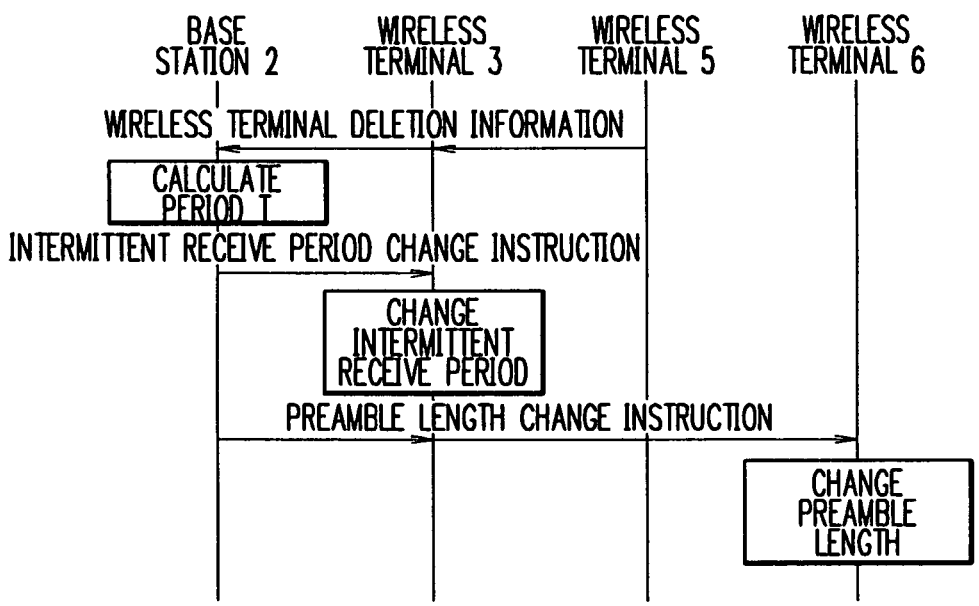
FIG. 10 is a chart showing a procedure for changing a period T according to the deletion of a wireless terminal from the network using the base station.

FIG. 10 is a chart showing a procedure for changing a period T according to the deletion of a wireless terminal from the network using the base station.

When the wireless terminal 5 is deleted from the multihop radio network, the wireless terminal 5 sends a wireless terminal deletion information signal to the base station 2. When receiving the wireless terminal deletion information signal, the base station 2 recalculates a period T, and sends an intermittent receive period change signal to the wireless terminal 3 and a preamble length change signal to the wireless terminal 6. As a result, the wireless terminal 3 carries out the intermittent receiving operation based on the specified period T and the wireless terminal 6 changes a preamble length on the basis of the specified period T.

Figure 11:
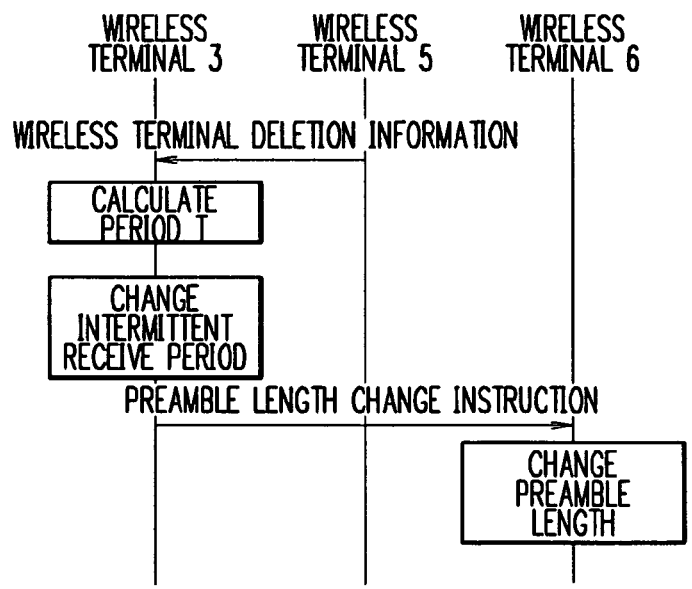
FIG. 11 is a chart showing a procedure for changing a period T according to the deletion of a wireless terminal from the network without using the base station.

FIG. 11 is a chart showing a procedure for changing a period T according to the deletion of a wireless terminal from the network without using the base station.

In this case, since the wireless terminal 5 sends radio signals to the wireless terminal 3, a period T is changed in a receiving side-led manner. On the other hand, when the wireless terminal 3 sends the radio signals to the wireless terminal 5, the period T is changed in a sending side-led manner.

When the wireless terminal 5 is deleted from the multihop radio network, the wireless terminal 5 sends a wireless terminal deletion information signal to the wireless terminal 3. When receiving the wireless terminal deletion information signal, the upstream wireless terminal 3 recalculates a period T to change its own intermittent receive period, and sends a preamble length change signal to the wireless terminal 6. As a result, the wireless terminal 3 carries out the intermittent receiving operation based on the calculated period T and the wireless terminal 6 changes a preamble length on the basis of the specified period T.

In this embodiment, examples of the calculation to obtain the period T according to the network topology change include the following.

When a new wireless terminal 5 is added to the multihop radio network, the number of the wireless terminals connected to the wireless terminal 3 increases. Therefore, assuming that the traffic from the wireless terminal 3 to the wireless terminals 5 and 6 increases, the period T is shortened. Besides, when the wireless terminal 5 is deleted from the multihop radio network, the number of the wireless terminals connected to the wireless terminal 3 is reduced. Thereby, assuming that the traffic from the wireless terminal 3 to the wireless terminal 6 is reduced, the period T is extended.

In the following, the operation of the radio communication system according to the third embodiment will be described.

In this embodiment, a period T is changed according to a time change using a timer or the like.

Figure 12:
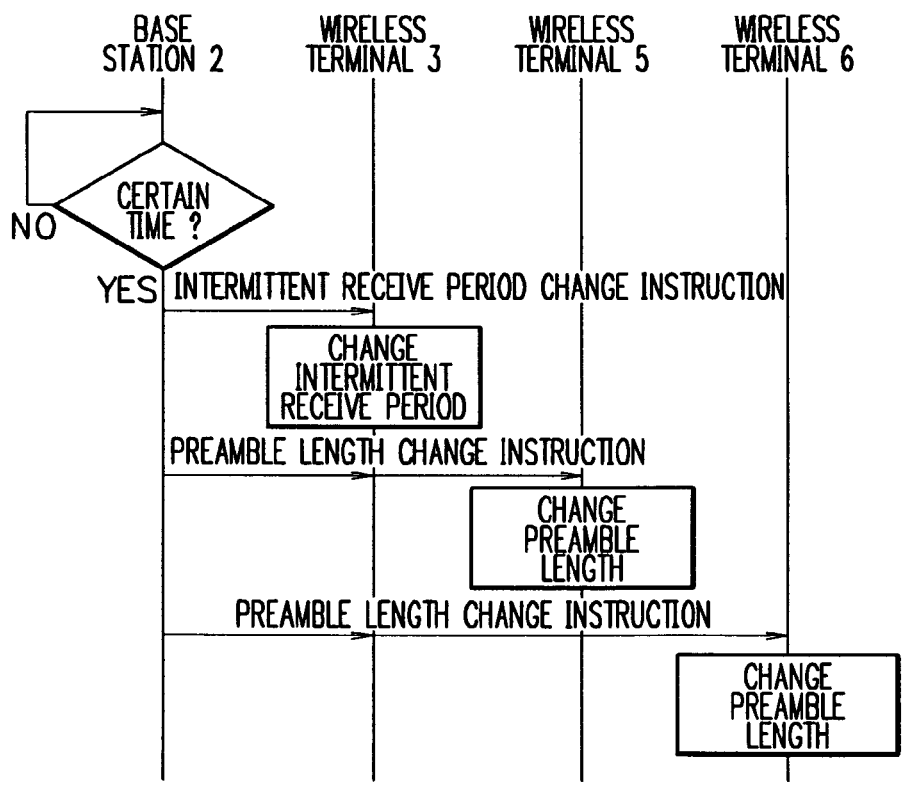
FIG. 12 is a chart showing a procedure for changing a period T according to a time change using the base station.

FIG. 12 is a chart showing a procedure for changing a period T according to a time change using the base station.

It is assumed that the base station 2 includes a built-in timer or obtains a timer signal from outside, and a value of a period T is scheduled with respect to each time. At a certain time, the base station 2 sends an intermittent receive period change signal to the wireless terminal 3 and a preamble length change signal to the wireless terminals 5 and 6 on the basis of information on the scheduled period T. As a result, the wireless terminal 3 carries out the intermittent receiving operation based on the specified period T, and the wireless terminals 5 and 6 change a preamble length on the basis of the specified period T.

Figure 13:
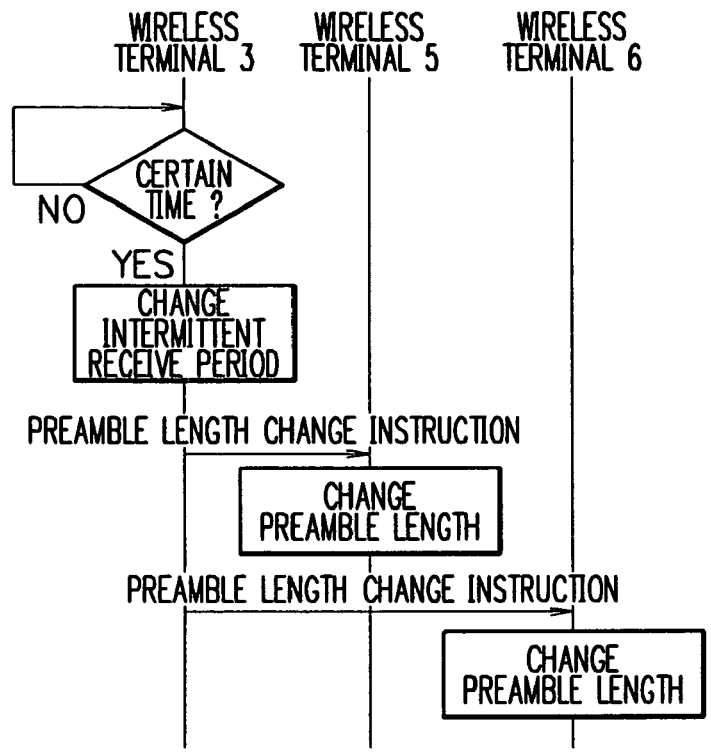
FIG. 13 is a chart showing a procedure for changing a period T according to a time change in a receiving side-led manner.

FIG. 13 is a chart showing a procedure for changing a period T according to a time change in a receiving side-led manner.

It is assumed that the wireless terminal 3 includes a built-in timer or obtains a timer signal from outside, and a value of a period T is scheduled with respect to each time. At a certain time, the wireless terminal 3 changes its own intermittent receive period and sends a preamble length change signal to the wireless terminals 5 and 6 on the basis of information on the scheduled period T. As a result, the wireless terminal 3 carries out the intermittent receiving operation based on the scheduled period T, and the wireless terminals 5 and 6 change a preamble length on the basis of the scheduled period T.

Figure 14:
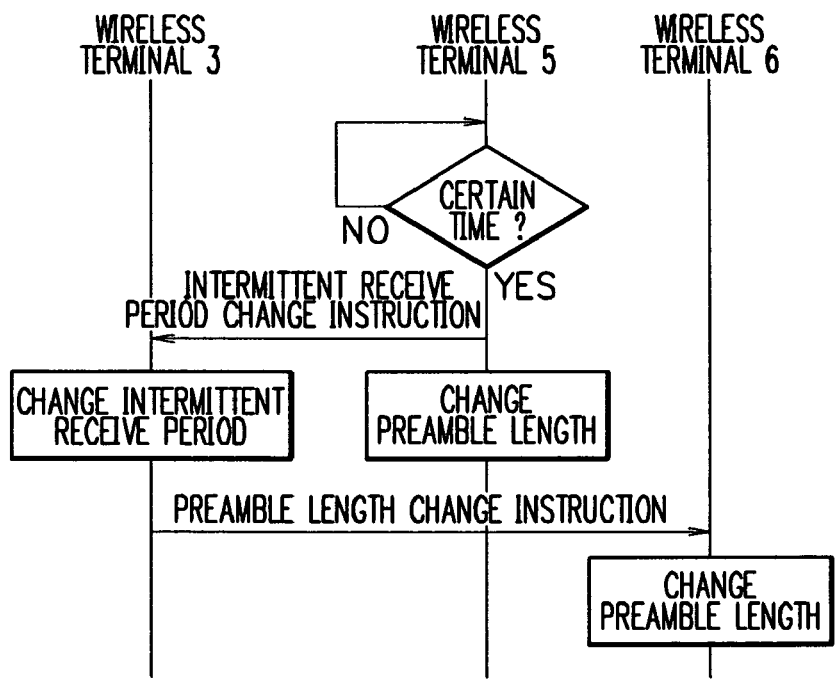
FIG. 14 is a chart showing a procedure for changing a period T according to a time change in a sending side-led manner.

FIG. 14 is a chart showing a procedure for changing a period T according to a time change in a sending side-led manner.

It is assumed that the wireless terminal 5 includes a built-in timer or obtains a timer signal from outside, and a value of a period T is scheduled with respect to each time. At a certain time, the wireless terminal 5 changes its own preamble length and sends an intermittent receive period change signal to the wireless terminal 3 on the basis of information on the scheduled period T. The wireless terminal 3 sends a preamble length change signal to the wireless terminal 6. As a result, the wireless terminal 3 carries out the intermittent receiving operation based on the calculated period T, and the wireless terminals 5 and 6 change a preamble length on the basis of the specified period T.

Figure 15:
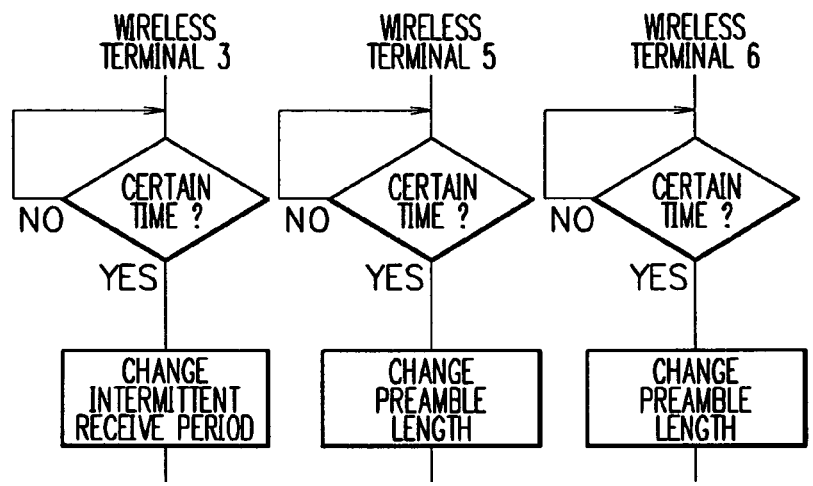
FIG. 15 is a chart showing a procedure for changing a period T according to a time change in a wireless terminal self-control manner.

FIG. 15 is a chart showing a procedure for changing a period T according to a time change in a wireless terminal self-control manner.

It is assumed that the wireless terminals 3, 5 and 6 include a built-in timer, respectively, or obtain a timer signal from outside, respectively, and values of periods T are scheduled with respect to each time, respectively, in the same manner. At a certain time, the wireless terminal 3 changes its own intermittent receive period and the wireless terminals 5 and 6 change their own preamble lengths in a self-control manner on the basis of information on the scheduled periods T, respectively. As a result, the wireless terminal 3 carries out the intermittent receiving operation based on the scheduled period T.

In this embodiment, examples of the calculation to obtain the period T according to the time change include the following.

During a time period in which a data flow amount is expected to be large, the period T is shortened, while during a time period in which a data flow amount is expected to be small, the period T is extended. Hence, when a communication frequency is low, a frequency of the intermittent receiving of data is decreased to reduce power consumption of the base station 2 and the wireless terminals 3 to 7 as low as possible.

In the following, the operation of the radio communication system according to the fourth embodiment will be described.

In this embodiment, a period T is changed according to a power consumption change due to a battery remaining power or the like.

Figure 16:
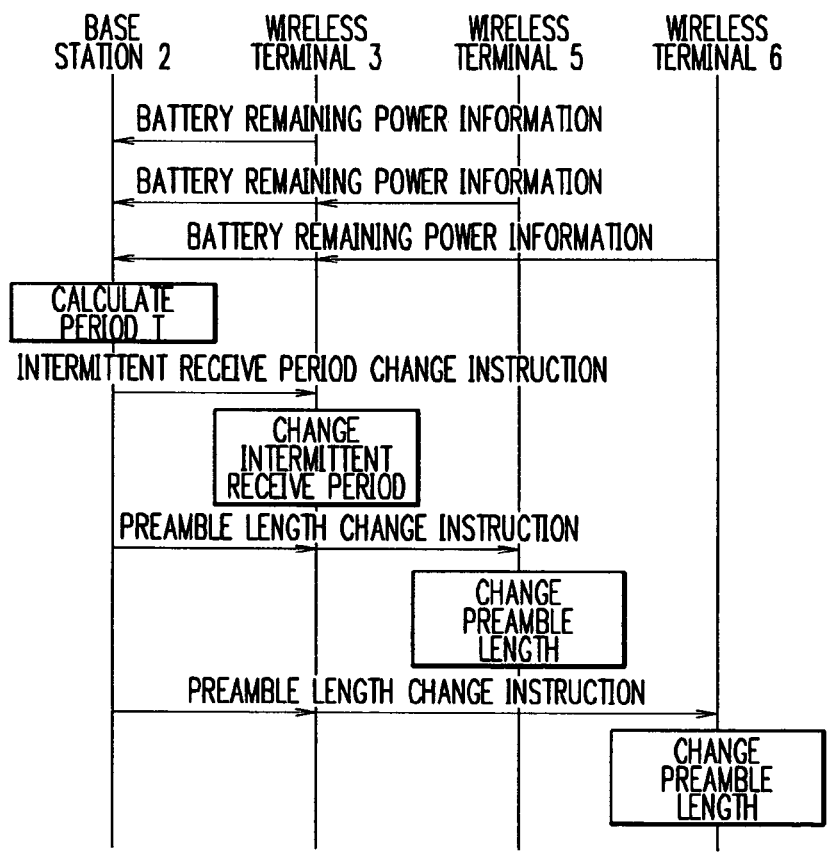
FIG. 16 is a chart showing a procedure for changing a period T according to a power consumption change using the base station.

FIG. 16 is a chart showing a procedure for changing a period T according to a power consumption change using the base station.

When receiving a battery remaining power information signal from the wireless terminals 3, 5 and 6, in the case that a battery remaining power or a battery consumption rate exceeds a certain threshold value, the base station 2 recalculates a period T, and sends an intermittent receive period change signal to the wireless terminal 3 and a preamble length change signal to the wireless terminals 5 and 6. As a result, the wireless terminal 3 carries out the intermittent receiving operation based on the specified period T, and the wireless terminals 5 and 6 change a preamble length on the basis of the specified period T.

Figure 17:
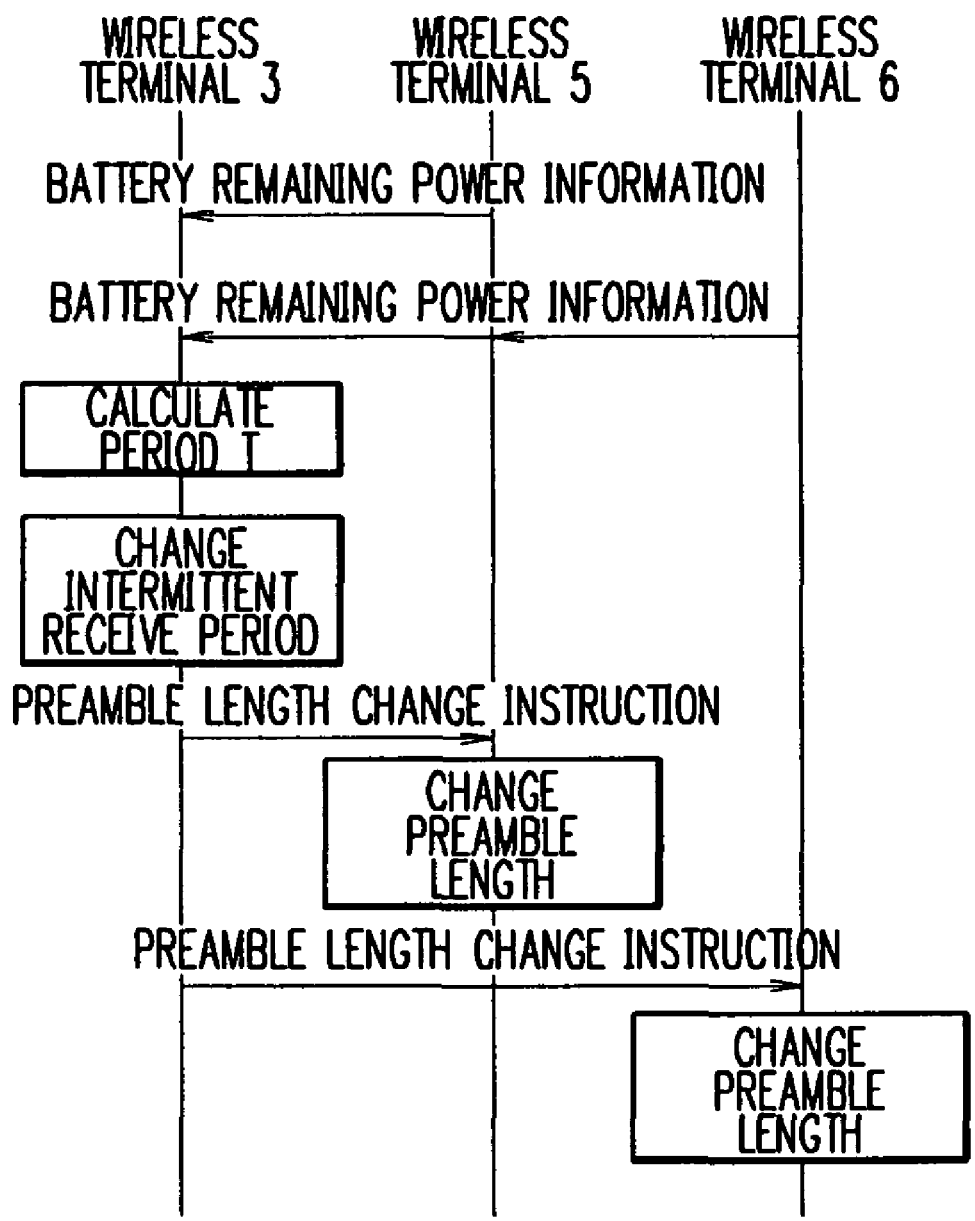
FIG. 17 is a chart showing a procedure for changing a period T according to a power consumption change without using the base station.

FIG. 17 is a chart showing a procedure for changing a period T according to a power consumption change without using the base station.

In this case, since a direction in which the wireless terminal 5 sends radio signals to the wireless terminal 3 is considered, a period T is changed in a receiving side-led manner. On the other hand, as to the other direction in which the wireless terminal 3 sends the radio signals to the wireless terminal 5, the period T is changed in a sending side-led manner.

When receiving a battery remaining power information signal from the wireless terminals 5 and 6, in the case that a battery remaining power or a battery consumption rate exceeds a certain threshold value, the upstream wireless terminal 3 recalculates a period T to change its own intermittent receive period, and sends a preamble length change signal to the wireless terminals 5 and 6. As a result, the wireless terminal 3 carries out the intermittent receiving operation based on the calculated period T, and the wireless terminals 5 and 6 change a preamble length on the basis of the specified period T.

In this embodiment, examples of the calculation to obtain the period T according to the power consumption change include the following.

When battery remaining power of the wireless terminals 3 to 7 are small or battery consumption rates of them are extremely high, in the case that the battery remaining power of the wireless terminals 3 to 7 in downstream locations of the wireless terminal concerned are small or the battery consumption rates of them in the downstream locations of the wireless terminal concerned are extremely high, a preamble length is extended to avoid the battery power consumption as much as possible.

As set forth hereinabove, in accordance with the present invention, a radio communication method, a radio communication system, a base station and a wireless terminal in a multihop radio network for realizing low power consumption and high network flexibility can be provided. Moreover, data transmission and reception can be carried out in both the directions at the same time.

Incidentally, in the aforementioned first to fourth embodiments, although data flow from the base station 2 to the wireless terminals 3 to 7 (the base station 2←the wireless terminal 3←the wireless terminal 5 or 6), the present invention is not restricted to the embodiments and data may flow from the wireless terminals 3 to 7 to the base station 2 (for example, the base station 2→the wireless terminal 3→the wireless terminal 5 or 6). In the latter case, a sending side terminal (for example, the wireless terminal 3) changes a preamble length and a receiving side terminal (for example, the wireless terminal 5 or 6) changes an intermittent receive period.

While the present invention has been described with reference to the particular illustrative embodiments, it is not to be restricted by those embodiments but only by the appended claims. It is to be appreciated that those skilled in the art can change and modify the embodiments without departing from the scope and spirit of the present invention.

What is claimed is:

1. A method of communicating in a multihop radio network including a plurality of wireless terminals, the method comprising:
at a first wireless terminal, one of increasing and decreasing an intermittent receive period of the first wireless terminal based on a characteristic of the multihop radio network; and
at a second wireless terminal, in response to the one of increasing and decreasing said intermittent receive period of the first wireless terminal, increasing a preamble length of data to be sent by the second wireless terminal to the first wireless terminal corresponding to the changed intermittent receive period if the intermittent receive period is increased, and decreasing the preamble length of data corresponding to the changed intermittent receive period if the intermittent receive period is decreased.

2. The method claimed in claim 1, wherein the characteristic comprises at least one of a change in traffic volume on the multihop radio network, a network topology change, a time change, remaining battery power of the plurality of wireless terminals, and an occurrence of an event.

3. The method claimed in claim 2, wherein one wireless terminal as a base station monitors the traffic volume, and if the monitored volume of traffic is larger than a predetermined upper limit value, the intermittent receive period and the preamble length of data of the plurality of wireless terminals are shortened and, if the monitored volume of traffic is smaller than a predetermined lower limit value, the intermittent receive period and the preamble length of data of the plurality of wireless terminals are extended.

4. The method claimed in claim 2, wherein if the volume of traffic received by the first wireless terminal from the second wireless terminal is larger than a predetermined upper limit value, the intermittent receive period of the first wireless terminal and the preamble length of data of the second wireless terminal are shortened and, if the volume of traffic received by the first wireless terminal from the second wireless terminal is smaller than a predetermined lower limit value, the intermittent receive period of the first wireless terminal and the preamble length of data of the second wireless terminal are extended.

5. The method claimed in claim 2, wherein if the volume of traffic sent from the second wireless terminal to the first wireless terminal is larger than a predetermined upper limit value, the intermittent receive period of the first wireless terminal and the preamble length of data of the second wireless terminal are shortened and, if the volume of traffic sent from the second wireless terminal to the first wireless terminal is smaller than a predetermined lower limit value, the intermittent receive period of the first wireless terminal and the preamble length of data of the second wireless terminal are extended.

6. The method claimed in claim 2, wherein one wireless terminal as a base station detects a topology change of the multihop radio network, and if an expected volume of traffic based on the detected topology change is larger than a predetermined upper limit value, the intermittent receive period and the preamble length of data of the plurality of wireless terminals are shortened and, if the expected volume of traffic based on the detected topology change is smaller than a predetermined lower limit value, the intermittent receive period and the preamble length of data of the plurality of wireless terminals are extended.

7. The method claimed in claim 2, wherein if an expected volume of traffic to be received by the first wireless terminal from the second wireless terminal based on a topology change of the multihop radio network is larger than a predetermined upper limit value, the intermittent receive period of the first wireless terminal and the preamble length of data of the second wireless terminal are shortened and, if the expected volume of traffic to be received by the first wireless terminal from the second wireless terminal based on the topology change is smaller than a predetermined lower limit value, the intermittent receive period of the first wireless terminal and the preamble length of data of the second wireless terminal are extended.

8. The method claimed in claim 2, wherein if an expected volume of traffic to be sent from the second wireless terminal to the first wireless terminal based on a topology change of the multihop radio network is larger than a predetermined upper limit value, the intermittent receive period of the first wireless terminal and the preamble length of data of the second wireless terminal are shortened and, if the expected volume of traffic to be sent from the second wireless terminal to the first wireless terminal based on the topology change is smaller than a predetermined lower limit value, the intermittent receive period of the first wireless terminal and the preamble length of data of the second wireless terminal are extended.

9. The method claimed in claim 2, wherein one wireless terminal as a base station detects the time change and, at a predetermined time, the intermittent receive period and the preamble length of data of the plurality of wireless terminals are changed.

10. The method claimed in claim 2, wherein the plurality of wireless terminals detect the time change and, at a predetermined time, and change the intermittent receive period and the preamble length of data of the plurality of wireless terminals.

11. The method claimed in claim 2, wherein if an expected volume of traffic to be received by the first wireless terminal from the second wireless terminal based on the time change is larger than a predetermined upper limit value, the intermittent receive period of the first wireless terminal and the preamble length of data of the second wireless terminal are shortened and, if the expected volume of traffic to be received by the first wireless terminal from the second wireless terminal based on the time change is smaller than a predetermined lower limit value, the intermittent receive period of the first wireless terminal and the preamble length of data of the second wireless terminal are extended.

12. The method claimed in claim 2, wherein if an expected volume of traffic to be sent from the second wireless terminal to the first wireless terminal based on the time change is larger than a predetermined upper limit value, the intermittent receive period of the first wireless terminal and the preamble length of data of the second wireless terminal are shortened and, if the expected volume of traffic to be sent from the second wireless terminal to the first wireless terminal based on the time change is smaller than a predetermined lower limit value, the intermittent receive period of the first wireless terminal and the preamble length of data of the second wireless terminal are extended.

13. The method claimed in claim 2, wherein the second wireless terminal detects the occurrence of an event, and if an expected volume of traffic to be sent from the second wireless terminal to the first wireless terminal based on the occurrence of the detected event is larger than a predetermined upper limit value, the intermittent receive period of the first wireless terminal and the preamble length of data of the second wireless terminal are shortened and, if the expected volume of traffic to be sent from the second wireless terminal to the first wireless terminal based on the occurrence of the detected event is smaller than a predetermined lower limit value, the intermittent receive period of the first wireless terminal and the preamble length of data of the second wireless terminal are extended.

14. The method claimed in claim 2, wherein the plurality of wireless terminals inform one wireless terminal as a base station of their remaining battery power, and the base station changes the intermittent receive period and the preamble length of data of the plurality of wireless terminals based on the remaining battery power.

15. The method claimed in claim 2, wherein the first wireless terminal detects a battery remaining power in the first wireless terminal, and if the detected remaining battery power is larger than a predetermined upper limit value, the intermittent receive period of the first wireless terminal and the preamble length of data of the second wireless terminal are shortened and, if the detected remaining battery power is smaller than a predetermined lower limit value, the intermittent receive period of the first wireless terminal and the preamble length of data of the second wireless terminal are extended.

16. The method claimed in claim 2, wherein one wireless terminal monitors at least one of the time change, a change in topology of the multihop radio network, and a change in received traffic of the multihop radio network, a change in transmitted traffic of the multihop radio network, the occurrence of the event and the remaining battery power of the plurality of wireless terminals, and determines the intermittent receive period and the preamble length of data of each of the plurality of wireless terminals based on the monitoring.

17. The method claimed in claim 1, wherein the plurality of wireless terminals are connected in a tree or mesh structure.

18. The method claimed in claim 1, wherein a receiving side of each of the plurality of wireless terminals is activated during the intermittent receive period, and wherein the receiving side is deactivated when not receiving a signal during the intermittent receive period.

19. The method claimed in claim 1, wherein the preamble length of data to be sent by the second wireless terminal to the first wireless terminal is greater than the intermittent receive period of the first wireless terminal.

20. The method claimed in claim 1, wherein if the intermittent receive period is increased, an increase of the preamble length of data matches an increase of the intermittent receive period and if the intermittent period is decreased, a decrease of the preamble length of data matches a decrease of the intermittent receive period.

21. A radio communication system of a multihop radio network including a plurality of wireless terminals, the system comprising:
   a first wireless terminal comprising:
      network characteristics detecting means for detecting a characteristic of the multihop radio network; and
      intermittent receive period setting means for setting an intermittent receive period of the first wireless terminal based on the characteristic detected by the network characteristics detecting means; and
   a second wireless terminal including preamble length changing means for increasing a preamble length of data to be sent by the second wireless terminal to the first wireless terminal corresponding to the intermittent receive period set by the intermittent receive period setting means if the intermittent receive period of the first wireless terminal is increased, and for decreasing the preamble length of data corresponding to the changed intermittent receive period if the intermittent receive period of the first wireless terminal is decreased,
   wherein if the network characteristics detecting means detects a change of the characteristic of the multihop radio network, the intermittent receive period setting means changes the intermittent receive period of the first wireless terminal, and the preamble length changing means changes the preamble length of data of the second wireless terminal in response to the intermittent receive period setting means changing the intermittent receive period of the first wireless terminal.

22. The radio communication system claimed in claim 21, wherein the characteristic comprises at least one of a change in traffic volume on the multihop radio network, a network topology change, a time change, remaining battery power of the plurality of wireless terminals, and an occurrence of an event.

23. The radio communication system claimed in claim 21, wherein the preamble length of data to be sent by the second wireless terminal to the first wireless terminal is greater than the intermittent receive period of the first wireless terminal.

24. The radio communication system claimed in claim 21, wherein if the intermittent receive period is increased, an increase of the preamble length of data increased by the preamble length changing means matches an increase of the intermittent receive period, and if the intermittent receive period is decreased, a decrease of the preamble length of data decreased by the preamble length changing means matches a decrease of the intermittent receive period.

25. The radio communication system claimed in claim 22, wherein one wireless terminal as a base station comprises:
   a monitoring means for monitoring the traffic volume of the multihop radio network;
   a determining means for determining the intermittent receive period and the preamble length of data of the plurality of wireless terminals based on the traffic volume monitored by the monitoring means; and
   an informing means for informing the plurality of wireless terminals of the intermittent receive period and the preamble length of data determined by the determining means;
   and wherein each of the plurality of wireless terminals include receiving means for receiving the information on the intermittent receive period and the preamble length of data from the base station, and the plurality of wireless terminals change their intermittent receive period and their preamble length of data based on the information received by the receiving means.

26. The radio communication system claimed in claim 22, wherein the first wireless terminal further includes measuring means for measuring a volume of data traffic received by the first wireless terminal from the second wireless terminal, and if the measured volume of data traffic is larger than a predetermined upper limit value, the intermittent receive period of the first wireless terminal and the preamble length of data of the second wireless terminal are shortened and, if the measured volume of data traffic received by the first wireless terminal from the second wireless terminal is smaller than a predetermined lower limit value, the intermittent receive period of the first wireless terminal and the preamble length of data of the second wireless terminal are extended.

27. The radio communication system claimed in claim 22, wherein the second wireless terminal further includes measuring means for measuring a volume of data traffic sent by the second wireless terminal to the first wireless terminal, and if the measured volume of traffic is larger than a predetermined upper limit value, the intermittent receive period of the first wireless terminal and the preamble length of data of the second wireless terminal are shortened and, if the measured volume of data traffic sent by the second wireless terminal to the first wireless terminal is smaller than a predetermined lower limit value, the intermittent receive period of the first wireless terminal and the preamble length of data of the second wireless terminal are extended.

28. The radio communication system claimed in claim 22, wherein one wireless terminal as a base station further includes:
   a detecting means for detecting a topology change of the multihop radio network;
   a predicting means for predicting the traffic on the multihop radio network based on the topology change detected by the detecting means;
   a determining means for determining the intermittent receive period and the preamble length of data of the plurality of wireless terminals based on the traffic predicted by the predicting means; and
   an informing means for informing the plurality of wireless terminals of the intermittent receive period and the preamble length of data determined by the determining means,
   wherein each of the plurality of wireless terminals includes receiving means for receiving the information on the intermittent receive period and the preamble length of data from the base station, and the plurality of wireless terminals change their intermittent receive period and their preamble length based on the information received by the receiving means.

29. The radio communication system claimed in claim 22, wherein the first wireless terminal further includes: detecting means for detecting a topology change of the multihop radio network; and predicting means for predicting a volume of traffic received by the first wireless terminal from the second wireless terminal based on the topology change detected by the detecting means, and if the volume of traffic predicted by the predicting means is larger than a predetermined upper limit value, the intermittent receive period of the first wireless terminal and the preamble length of data of the second wireless terminal are shortened and, if the predicted volume of traffic received by the first wireless terminal from the second wireless terminal based on the topology change is smaller than a predetermined lower limit value, the intermittent receive period of the first wireless terminal and the preamble length of data of the second wireless terminal are extended.

30. The radio communication system claimed in claim 22, wherein the second wireless terminal further comprises:
a detecting means for detecting a topology change of the multihop radio network; and
a predicting means for predicting a volume of traffic sent from the second wireless terminal to the first wireless terminal based on the topology change detected by the detecting means, and if the volume of traffic predicted by the predicting means is larger than a predetermined upper limit value, the intermittent receive period of the first wireless terminal and the preamble length of data of the second wireless terminal are shortened and, if the predicted volume of traffic sent from the second wireless terminal to the first wireless terminal based on the topology change is smaller than a predetermined lower limit value, the intermittent receive period of the first wireless terminal and the preamble length of data of the second wireless terminal are extended.

31. The radio communication system claimed in claim 22, wherein one wireless terminal as a base station further comprises:
a clock means for obtaining a time;
a determining means for determining the intermittent receive period and the preamble length of data of the plurality of wireless terminals based on the time obtained by the clock means; and
an informing means for informing the plurality of wireless terminals of the intermittent receive period and the preamble length of data determined by the determining means,
wherein each of the plurality of wireless terminals include receiving means for receiving the information on the intermittent receive period and the preamble length of data from the base station, and the plurality of wireless terminals change their intermittent receive period and their preamble length based on the change information received by the receiving means.

32. The radio communication system claimed in claim 22, wherein each of the plurality of wireless terminals further comprise:
a clock means for obtaining a time; and
a determining means for determining the intermittent receive period and the preamble length of data of the wireless terminal based on the time obtained by the clock means.

33. The radio communication system claimed in claim 22, wherein the first wireless terminal further comprises:
a clock means for obtaining a time;
a predicting means for predicting a volume of traffic received by the first wireless terminal from the second wireless terminal which varies according to the time obtained by the clock means; and
an expecting means for predicting the volume of traffic received by the first wireless terminal from the second wireless terminal, and if the volume of traffic predicted by the expecting means is larger than a predetermined upper limit value, the intermittent receive period of the first wireless terminal and the preamble length of data of the second wireless terminal are shortened and, if the predicted volume of traffic received by the first wireless terminal from the second wireless terminal is smaller than a predetermined lower limit value, the intermittent receive period of the first wireless terminal and the preamble length of data of the second wireless terminal are extended.

34. The radio communication system claimed in claim 22, wherein the second wireless terminal further comprises:
a clock means for obtaining a time;
a predicting means for predicting a volume of traffic sent from the second wireless terminal to the first wireless terminal which varies according to the time obtained by the clock means; and
an expecting means for expecting the volume of traffic sent from the second wireless terminal to the first wireless terminal, and if the volume of expected traffic is larger than a predetermined upper limit value, the intermittent receive period of the first wireless terminal and the preamble length of data of the second wireless terminal are shortened and, if the expected volume of traffic sent from the second wireless terminal to the first wireless terminal is smaller than a predetermined lower limit value, the intermittent receive period of the first wireless terminal and the preamble length of data of the second wireless terminal are extended.

35. The radio communication system claimed in claim 22, wherein the second wireless terminal further comprises:
a detecting means for detecting the occurrence of an event; and
predicting means for predicting a volume of traffic to be sent from the second wireless terminal to the first wireless terminal based on the occurrence of the event detected by the detecting means, and if the predicted volume of traffic to be sent from the second wireless terminal to the first wireless terminal based on the occurrence of the event is larger than a predetermined upper limit value, the intermittent receive period of the first wireless terminal and the preamble length of data of the second wireless terminal are shortened and, if the predicted volume of traffic to be sent from the second wireless terminal to the first wireless terminal based on the occurrence of the event is smaller than a predetermined lower limit value, the intermittent receive period of the first wireless terminal and the preamble length of data of the second wireless terminal are extended.

36. The radio communication system claimed in claim 22, wherein each of the plurality of wireless terminals further comprise:
a detecting means for detecting a remaining battery power of the wireless terminal; and
a determining means for determining the intermittent receive period and the preamble length of the wireless terminals according to the detected remaining battery power.

37. The radio communication system claimed in claim 22, wherein the first wireless terminal further includes a detecting means for detecting a remaining battery power of the first wireless terminal, and if the detected remaining battery power is larger than a predetermined upper limit value, the intermittent receive period of the first wireless terminal and the preamble length of data of the second wireless terminal are shortened and, if the detected remaining battery power is smaller than a predetermined lower limit value, the intermittent receive period of the first wireless terminal and the preamble length of data of the second wireless terminal are extended.

38. The radio communication system claimed in claim 22, wherein each of the plurality of wireless terminals further comprises:
    a monitoring means for monitoring at least one of the time change, the network topology change of the multihop radio network, traffic received by the multihop radio network, traffic transmitted by the multihop radio network, the occurrence of the event, and remaining battery power of one or more the plurality of wireless terminals;
    a monitor information sending means for sending information monitored by the monitoring means to a specific wireless terminal as change information; and
    a setting information receiving means for receiving information on at least one of an intermittent receive period and a preamble length of data from the specific wireless terminal,
    wherein the specific wireless terminal includes:
        change information receiving means for receiving the change information from each of the plurality of wireless terminals; and
        determining means for determining setting information on at least one of the intermittent receive period and the preamble length of data of each of the plurality of wireless terminals based on the received change information; and
        setting information sending means for sending the setting information to each wireless terminal, and
    wherein each of the plurality of wireless terminals sets the intermittent receive period and the preamble length of data based on the received setting information.

39. A wireless terminal constituting a radio communication system of a multihop radio network including a plurality of wireless terminals, the wireless terminal comprising:
    a network characteristics detecting means for detecting a characteristic of the multihop radio network;
    an intermittent receive period setting means for setting an intermittent receive period of the wireless terminal; and
    preamble length changing means for increasing a preamble length of data to be sent by the wireless terminal to another wireless terminal corresponding to the set intermittent receive period of the wireless terminal if the intermittent receive period is increased, and for decreasing the preamble length of data corresponding to the set intermittent receive period if the intermittent receive period of the wireless terminal is decreased,
    wherein if the network characteristics detecting means detects a change of the characteristic of the network, the intermittent receive period setting means changes the intermittent receive period, and the preamble changing means changes the preamble length of data in response to the intermittent receive period setting means changing the intermittent receive period.

40. The wireless terminal claimed in claim 39, wherein the characteristic comprises at least one of a change in traffic volume on the multihop radio network, a network topology change, a time change, remaining battery power of the plurality of wireless terminals, and an occurrence of an event.

41. The wireless terminal claimed in claim 39, wherein preamble length of data to be sent by the wireless terminal to the other wireless terminal is greater than the set intermittent receive period.

42. The wireless terminal claimed in claim 39, wherein if the intermittent receive period is increased, an increase of the preamble length of data increased by the preamble length changing means matches an increase of the intermittent receive period, and if the intermittent receive period is decreased, a decrease of the preamble length of data decreased by the preamble length changing means matches a decrease of the intermittent receive period.

43. The wireless terminal claimed in claim 40 further comprising:
    a monitoring means for monitoring the volume of traffic on the multihop radio network;
    a determining means for determining the intermittent receive period and the preamble length of data of the plurality of wireless terminals based on the volume of traffic monitored by the monitoring means; and
    informing means for informing the plurality of wireless terminals of the intermittent receive period and the preamble length of data determined by the determining means.

44. The wireless terminal claimed in claim 43 further comprising:
    a detecting means for detecting a topology change of the multihop radio network;
    a predicting means for predicting traffic volume based on the topology change detected by the detecting means;
    a determining means for determining the intermittent receive period and the preamble length of data of the plurality of wireless terminals based on the traffic predicted by the predicting means; and
    an informing means for informing the plurality of wireless terminals of the intermittent receive period and the preamble length of data determined by the determining means.

45. The wireless terminal claimed in claim 44 further comprising:
    a clock means for obtaining a time;
    a determining means for determining the intermittent receive period and the preamble length of data of the plurality of wireless terminals based on the time obtained by the clock means; and
    an informing means for informing the plurality of wireless terminals of the intermittent receive period and the preamble length of data determined by the determining means.

46. The wireless terminal claimed in claim 44 further comprising:
    a receiving means for receiving information on a remaining battery power of another wireless terminal from the other wireless terminal;
    a determining means for determining the intermittent receive period and the preamble length of data of the plurality of wireless terminals based on the remaining battery power of the other wireless terminal; and
    an informing means for informing the plurality of wireless terminals of the intermittent receive period and the preamble length of data determined by the determining means.

47. The wireless terminal claimed in claim 44 further comprising:
    a receiving means for receiving information on the occurrence of an event from another wireless terminal;

a determining means for determining the intermittent receive period and the preamble length of data of the plurality of wireless terminals based on the occurrence of the event informed by the other wireless terminal; and an informing means for informing the plurality of wireless terminals of the intermittent receive period and the preamble length of data determined by the determining means.

48. The wireless terminal claimed in claim 44 further comprising a receiving means for receiving information on the intermittent receive period and the preamble length of data from another wireless terminal, wherein each of the plurality of wireless terminals change their intermittent receive period and their preamble length based on the received information.

49. The wireless terminal claimed in claim 48 further comprising a detecting means for detecting at least one of the change in traffic volume, the network topology change, the remaining battery power of the plurality of wireless terminals, and the occurrence of the event, and informing the plurality of wireless terminals of the information detected by the detecting means.

50. The wireless terminal claimed in claim 44 further comprising a preamble length change requesting means for requesting the plurality of wireless terminals to change their preamble length of data according to the change of the intermittent receive period.

51. The wireless terminal claimed in claim 44 further comprising an intermittent receive period change requesting means for requesting the plurality of wireless terminals to change their intermittent receive period according to the change of the preamble length of data.

52. The wireless terminal claimed in claim 44 further comprising a receiving means for receiving a preamble length change request from another wireless terminal, and
wherein the wireless terminal changes the preamble length of data of the wireless terminal based on the received preamble length change request.

53. The wireless terminal claimed in claim 44 further comprising a receiving means for receiving an intermittent receive period change request from another wireless terminal, and
wherein the wireless terminal changes the intermittent receive period of the wireless terminal on the basis of the received intermittent receive period change request.

54. The wireless terminal claimed in claim 44 further comprising a measuring means for measuring a volume of traffic received by the wireless terminal, and if the received volume of traffic is larger than a predetermined upper limit value, the intermittent receive period of the wireless terminal is shortened and, if the received volume of traffic is smaller than a predetermined lower limit value, the intermittent receive period of the wireless terminal is extended.

55. The wireless terminal claimed in claim 44 further comprising a measuring means for measuring a volume of traffic transmitted by the wireless terminal, and if the volume of traffic transmitted by the wireless terminal is larger than a predetermined upper limit value, the preamble length of data of the wireless terminal is shortened and, if the volume of traffic is smaller than a predetermined lower limit value, the preamble length of data of the wireless terminal is extended.

56. The wireless terminal claimed in claim 44 further comprising a detecting means for detecting a topology change of the multihop radio network and a predicting means for predicting the volume of traffic received by the wireless terminal based on the topology change, and if the predicted volume of traffic is larger than a predetermined upper limit value, the intermittent receive period of the wireless terminal is shortened and, if the volume of traffic is smaller than a predetermined lower limit value, the intermittent receive period of the wireless terminal is extended.

57. The wireless terminal claimed in claim 44 further comprising a detecting means for detecting a topology change of the multihop radio network and a predicting means for predicting a volume of traffic transmitted by the wireless terminal based on the topology change, and if the predicted volume of traffic is larger than a predetermined upper limit value, the preamble length of data of the wireless terminal is shortened and, if the predicted volume of traffic is smaller than a predetermined lower limit value, the preamble length of data of the wireless terminal is extended.

58. The wireless terminal claimed in claim 44 further comprising a clock means for obtaining a time and a predicting means for predicting a volume of traffic received by the wireless terminal based on the time change, and if the predicted volume of traffic is larger than a predetermined upper limit value, the intermittent receive period of the wireless terminal is shortened and, if the predicted volume of traffic is smaller than a predetermined lower limit value, the intermittent receive period of the wireless terminal is extended.

59. The wireless terminal claimed in claim 44 further comprising a clock means for obtaining a time and a predicting means for predicting a volume of traffic transmitted by the wireless terminal based on the time change, and if the predicted volume of traffic is larger than a predetermined upper limit value, the preamble length of data of the wireless terminal is shortened and, if the volume of traffic is smaller than a predetermined lower limit value, the preamble length of data of the wireless terminal is extended.

60. The wireless terminal claimed in claim 44 further comprising a detecting means for detecting the occurrence of an event and a predicting means for predicting the volume of traffic to be sent from a first wireless terminal to a second wireless terminal based on the occurrence of the detected event, and if the predicted volume of traffic is larger than a predetermined upper limit value, the intermittent receive period of the first wireless terminal and the preamble length of data of the second wireless terminal are shortened and, if the predicted volume of traffic is smaller than a predetermined lower limit value, the intermittent receive period of the first wireless terminal and the preamble length of data of the second wireless terminal are extended.

61. The wireless terminal claimed in claim 44 further comprising a detecting means for detecting a remaining battery power of another wireless terminal, and if the detected remaining battery power is larger than a predetermined upper limit value, the intermittent receive period of a first wireless terminal and the preamble length of data of a second wireless terminal are shortened and, if the detected remaining battery power is smaller than a predetermined lower limit value, the intermittent receive period of the first wireless terminal and the preamble length of data of the second wireless terminal are extended.

62. The wireless terminal claimed in claim 44 further comprising a receiving means for receiving information on at least one of the intermittent receive period of the wireless terminal and the preamble length of data of the wireless terminal from a specific wireless terminal, and
wherein the wireless terminal changes at least one of the intermittent receive period of the wireless terminal and the preamble length of the wireless terminal based on the information received from the specific wireless terminal.

63. The wireless terminal claimed in claim 62 further comprising a monitoring means for monitoring at least one of the time change, the network topology change of the multihop radio network, traffic received by the multihop radio network, traffic transmitted by the multihop radio network, the occurrence of the event and remaining battery power of one or more of the plurality of wireless terminals, and a sending means for sending the information monitored by the monitoring means to the specific wireless terminal.

64. The wireless terminal claimed in claim 44 further comprising a determining means for determining setting information on at least one of the intermittent receive period and the preamble length of the plurality of wireless terminals except the wireless terminal itself and a sending means for sending the setting information to the plurality of wireless terminals except the wireless terminal itself.

65. The wireless terminal claimed in claim 44 further comprising:

a receiving means for receiving information on at least one of the network topology of the multihop radio network, traffic received by the multihop radio network, traffic transmitted by the multihop radio network, the occurrence of the event and remaining battery power of the plurality of wireless terminals except the wireless terminal itself; and a determining means for determining setting information on at least one of the intermittent receive period and the preamble length of data of each of the plurality of wireless terminals based on the information received by the receiving means; and a sending means for sending the setting information to the plurality of wireless terminals.

* * * * *